United States Patent
Kujawski, Jr.

(10) Patent No.: US 10,422,460 B2
(45) Date of Patent: Sep. 24, 2019

(54) FLUID CONNECTOR WITH FULL INSERTION ASSURANCE CAP WITH SECONDARY LATCHES

(71) Applicant: Oetiker NY, Inc., Lancaster, NY (US)

(72) Inventor: James Anthony Kujawski, Jr., Attica, NY (US)

(73) Assignee: Oetiker NY, Inc., Lancaster, NY (US)

(*) Notice: Subject to any disclaimer, the term of this patent is extended or adjusted under 35 U.S.C. 154(b) by 858 days.

(21) Appl. No.: 14/725,639

(22) Filed: May 29, 2015

(65) Prior Publication Data

US 2015/0345684 A1 Dec. 3, 2015

Related U.S. Application Data

(60) Provisional application No. 62/005,136, filed on May 30, 2014.

(51) Int. Cl.
 *F16L 21/08* (2006.01)
 *F16L 37/138* (2006.01)
 (Continued)

(52) U.S. Cl.
 CPC ..... *F16L 37/138* (2013.01); *F02M 35/10091* (2013.01); *F16L 21/08* (2013.01);
 (Continued)

(58) Field of Classification Search
 CPC ... F16L 37/138; F16L 37/1225; F16L 37/088; F16L 37/084; F16L 2201/10;
 (Continued)

(56) References Cited

U.S. PATENT DOCUMENTS

| 2,377,812 A | 6/1945 | Scheiwer |
| 3,245,423 A | 4/1966 | Hansen et al. |

(Continued)

FOREIGN PATENT DOCUMENTS

| KR | 200269735 | 3/2002 |
| KR | 101180871 | 12/2011 |

(Continued)

*Primary Examiner* — Anna M Momper
*Assistant Examiner* — James A Linford
(74) *Attorney, Agent, or Firm* — Simpson & Simpson, PLLC

(57) ABSTRACT

A fluid connector assembly includes a connector body receiving a tubular member locked in place by a retainer clap carried on the connector body. An assurance cap mounted over the tubular member is movable to a forward most latched position on the connector body relative to the tubular member only when the tubular member is in the fully inserted, latched position in the connector body. The assurance cap body includes a plurality of alternating primary latch fingers and step fingers respectively engageable with a recess groove in the connector body and a raised surface on the tubular member. Secondary latches can include an inner support ring carried on the assurance cap body comprising an inner end engageable with a raised surface on the tubular member when the primary latched fingers are engaged with the recessed groove in the connector body.

15 Claims, 19 Drawing Sheets

(51) Int. Cl.
*F16L 37/084* (2006.01)
*F02M 35/10* (2006.01)
*F16L 37/088* (2006.01)
*F16L 37/12* (2006.01)

(52) U.S. Cl.
CPC .......... *F16L 37/084* (2013.01); *F16L 37/088* (2013.01); *F16L 37/1225* (2013.01); *F16L 2201/10* (2013.01)

(58) Field of Classification Search
CPC ... F16L 37/0842; F16L 37/096; F16L 37/098; F16L 37/0985; F02M 35/10091
USPC .................................. 285/81, 84, 85, 86, 87
See application file for complete search history.

(56) References Cited

U.S. PATENT DOCUMENTS

| | | | |
|---|---|---|---|
| 3,428,340 A | 3/1967 | Pelton | |
| 3,453,005 A * | 7/1969 | Foults | F16L 37/088 137/583 |
| 3,532,101 A | 10/1970 | Snyder, Jr. | |
| 3,824,170 A | 7/1974 | Weelink et al. | |
| 3,922,011 A | 11/1975 | Walters | |
| 3,984,133 A * | 10/1976 | Bird | F16L 33/30 285/133.21 |
| 4,332,402 A * | 6/1982 | Shellhause | F16L 37/138 285/322 |
| 4,915,421 A | 4/1990 | Dennany, Jr. | |
| 5,005,877 A * | 4/1991 | Hayman | F16L 37/0842 285/315 |
| 5,343,892 A | 9/1994 | Saito | |
| 5,452,924 A | 9/1995 | Kujawski | |
| 5,630,570 A | 5/1997 | Lacroix et al. | |
| 5,725,257 A * | 3/1998 | Sakane | F16L 37/088 285/319 |
| 5,749,606 A * | 5/1998 | Lu | F16L 37/088 285/305 |
| 5,758,682 A | 6/1998 | Cain | |
| 5,816,298 A | 10/1998 | Stricklin et al. | |
| 5,909,901 A | 6/1999 | Zillig et al. | |
| 6,478,343 B2 | 11/2002 | King Lee | |
| 6,543,814 B2 | 4/2003 | Bartholomew | |
| 6,582,151 B2 | 6/2003 | Hopson | |
| 6,655,316 B2 | 12/2003 | Kerger et al. | |
| 6,688,655 B1 * | 2/2004 | Watanabe | F16L 37/088 285/308 |
| 6,920,896 B2 | 7/2005 | Kerger et al. | |
| 7,195,228 B2 | 3/2007 | Tiberghien et al. | |
| 7,387,318 B2 | 6/2008 | Yoshida | |
| 7,458,392 B2 | 12/2008 | Cornwell | |
| 7,516,989 B2 | 4/2009 | Yoshida | |
| 7,618,070 B2 | 11/2009 | Stoll et al. | |
| 7,686,345 B2 | 3/2010 | Hartmann | |
| 7,722,089 B2 | 5/2010 | Nauer | |
| 8,012,030 B2 | 9/2011 | Cermak et al. | |
| 8,146,956 B2 | 4/2012 | Chaupin | |
| 8,267,376 B2 | 9/2012 | Hansen | |
| 8,322,941 B2 | 12/2012 | Cermak | |
| 2003/0001384 A1 * | 1/2003 | Carroll | F16J 15/025 285/45 |
| 2005/0087245 A1 | 4/2005 | Magnus et al. | |
| 2008/0084061 A1 | 4/2008 | Kertesz et al. | |
| 2010/0224258 A1 | 9/2010 | Steveley et al. | |
| 2013/0037141 A1 | 2/2013 | Kujawski, Jr. et al. | |
| 2013/0175795 A1 * | 7/2013 | Taylor | F02M 37/0017 285/45 |
| 2013/0200607 A1 | 8/2013 | Rodenberg et al. | |
| 2015/0211668 A1* | 7/2015 | Campbell | F16L 25/009 285/330 |

FOREIGN PATENT DOCUMENTS

| | | | | |
|---|---|---|---|---|
| WO | WO-03106879 A1 | * | 12/2003 | .......... F16L 37/0842 |
| WO | WO-2008139932 A1 | * | 11/2008 | ............ F16L 37/091 |
| WO | WO-2014026792 A1 | * | 2/2014 | .......... F16L 37/0985 |

* cited by examiner

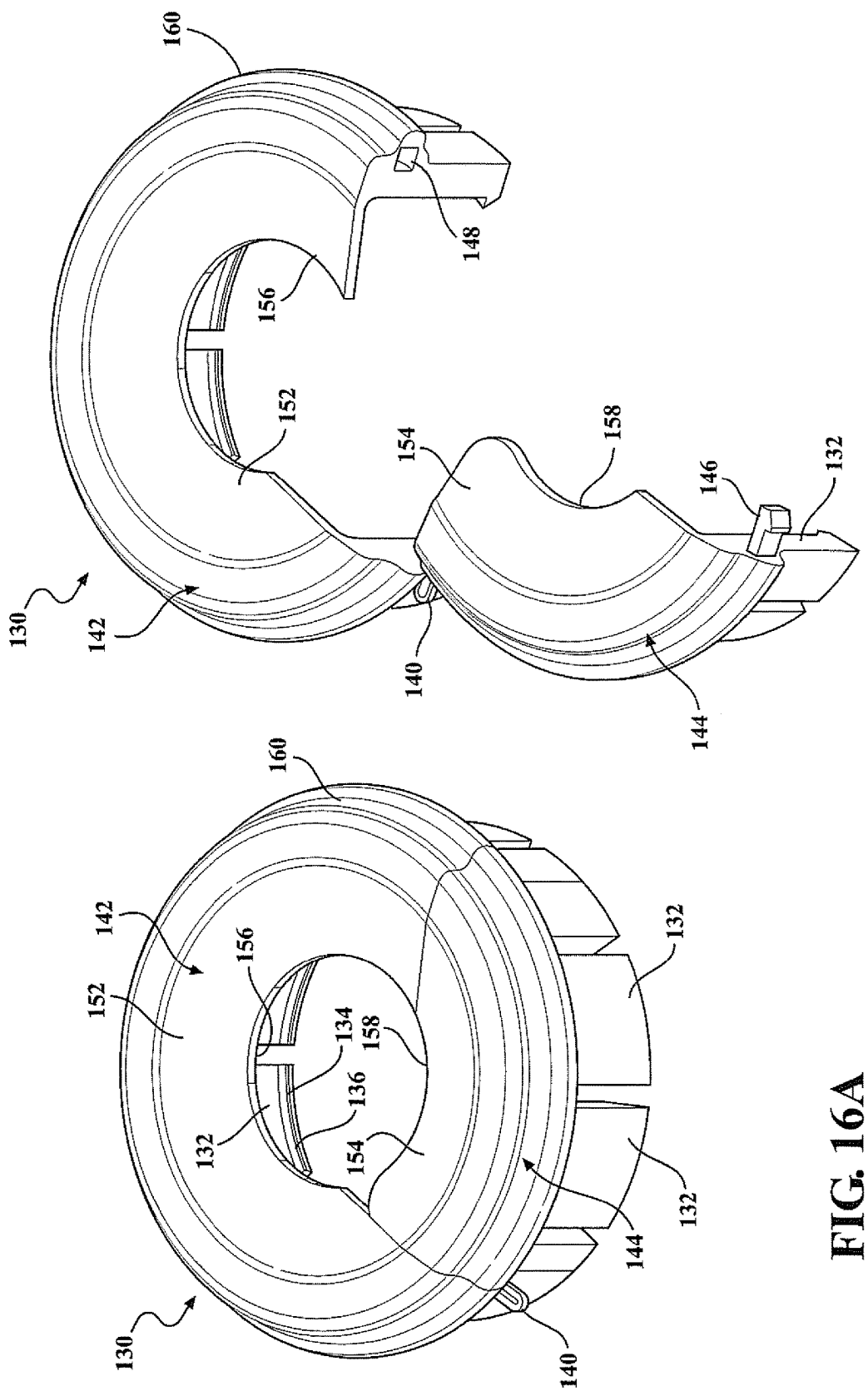

FLUID CONNECTOR WITH FULL INSERTION ASSURANCE CAP WITH SECONDARY LATCHES

CROSS-REFERENCE TO CO-PENDING APPLICATION

The present application claims priority benefit to the May 30, 2014 filing date of U.S. Provisional Patent Application Ser. No. 62/005,136, the entire contents of which are incorporated herein in its entirety.

BACKGROUND

The present apparatus relates to fluid connectors including a fluid carrying tubular member which is coupled to a fitting body connected to a device which uses the fluid. In an automotive application, the fluid carrying components are connected at one end to an automatic transmission and at another end to a cooler disposed within a vehicle radiator. Other automotive applications using fluid connectors include turbo connections.

Such quick connectors typically include a resilient clip carried on the fitting body which is adapted to snap behind a raised shoulder of an end form on the tubular member when the tubular member is fully inserted into the fitting body to lock the tubular member in place.

Assurance caps can be used to insure full insertion of the tubular member in the body. As assurance cap is carried by the tubular member and slides over the tubular member insertion end of the body and snaps over the outer edges of the resilient clip. If the tubular member is not fully inserted in the body such that the resilient clip is not seated behind the raised shoulder on the tubular member, raised portions of the resilient clip extend further radially outward from the body and interfere with the complete movement of the assurance cap to its fully installed position thereby providing an indication to the installer that the tubular member is not fully latched in the body.

SUMMARY

A fluid connection with an assurance cap for assuring full insertion and latching of a tubular member in a connector body comprising an endform spaced from a first insertion end defining a radially disposed shoulder, a connector body comprising a bore with one open end receiving the tubular member. A retainer clip is carried on the connector body and extends partially into the bore to engage the shoulder of the tubular member to lock the tubular member in the connector body when an insertion end of the tubular member is fully inserted into the bore in the fitting body. An assurance cap is slidably mounted relative to the tubular member. The assurance cap defining an annular body with a plurality of primary latch fingers with end projections configured for latching in a recessed groove in the connector body spaced from one end of the connector body to latch the assurance cap on the connector body only when the tubular member is fully inserted into the connector body. A secondary latch is carried on the assurance cap body for engaging one of the retainer clip and the tubular member to secondarily latch the assurance cap to the tubular member only when the tubular member is fully inserted into the bore in the connector body.

The primary latch fingers may comprise a plurality of circumferentially spaced primary latch fingers extending from a first end of the assurance cap body.

In one aspect, the primary latch fingers include a radially inward projection formed on a flexible end of the primary latch finger; and a radially outward opening groove formed in the connector body, spaced from the one open end of the connector body, the groove and the projections on the primary latch fingers engageable to primarily latch the assurance cap to the connector body only when the tubular member is fully inserted into the bore in the connector body.

The secondary latch may include an inner support ring fixed in the assurance cap body radially inward of the primary latch fingers, the inner support ring comprising a through bore through which the tubular member extend, the inner support ring comprising an inner end positioned to engage a surface on the tubular member to provide a secondary latch between the assurance cap body and the tubular member when the tubular member is fully inserted into the bore in the connector body.

The surface on the tubular member is axially spaced from the endform and defines a raised surface on the tubular member.

The secondary latch may include a plurality of stepped fingers circumferentially spaced between the primary latch finger, each of the stepped fingers comprising an inner stepped surface configured to overlay a radially outward portion of the retainer clip when the assurance cap is latched to the quick connector body and the tubular member to resist radially outward expansion of the retainer clip.

The primary latch fingers may include a plurality of circumferentially spaced primary latch fingers extending from a first end of the assurance cap body, and one stepped finger disposed intermediate at least one primary latch finger.

The plurality of primary latch fingers may be arranged in circumferentially spaced pairs of adjacent side-by-side arranged primary latch fingers, and one stepped finger is interposed between each pair of primary latch fingers.

The raised portion of the connector body may include an outward extending tapered portion extending from the outer diameter of the connector body to the outer surface of the raised portion on the connector body.

The raised portion formed on a receiving end of the fitting body comprising an outer diameter substantially equal to an outer diameter of the receiving end of the fitting body extending from the receiving end of the fitting body, an annular recess positioned adjacent to the raised portion for receiving the latch fingers of the assurance cap in a latch position of the assurance cap on the fitting body.

The connector assembly including the assurance cap body comprising pivotally connected first and second sections lockable in a continuous annular body about the tubular member, and the first and second section of the assurance cap body being pivotally movable relative to a pivotally connected end to allow mounting of the assurance cap body around the tubular member.

The connector assembly including secondary latch includes an inner support ring fixed in the assurance cap body radially inward of the primary latch fingers, the inner support ring comprising a through bore through which the tubular member extends, the inner support ring comprising an inner end positioned to engage a surface on the tubular member to provide a secondary latch between the assurance cap body and the tubular member when the tubular member is fully inserted into the bore in the connector body, the surface on the tubular member is axially spaced from the endform and defines a raised surface on the tubular member; a plurality of stepped fingers circumferentially spaced between the primary latch fingers, and each of the stepped fingers comprising an inner stepped surface configured to overlay a radially outward portion of the retainer clip when the assurance cap is latched to the quick connector body and the tubular member to resist radially outward expansion of the retainer clip.

The connector assembly includes the primary latch fingers further including a plurality of circumferentially spaced primary latch fingers extending from a first end of the assurance cap body, and one step finger disposed intermediate at least one primary latched finger.

The connector assembly including the plurality of primary latch fingers arranged in circumferentially spaced pairs of adjacent side-by-side arranged primary latch fingers, and one stepped finger interposed between each pair of primary latch fingers.

BRIEF DESCRIPTION OF THE DRAWING

The various features, advantages and other uses of the present fluid connector with full insertion assurance cap with secondary latches will become more apparent by referring to the following description and drawings in which:

FIG. 16A is another aspect of an assurance cap;

FIG. 16B is a partially opened, perspective view of the assurance cap shown in FIG. 16A;

DETAILED DESCRIPTION

Figure 1:
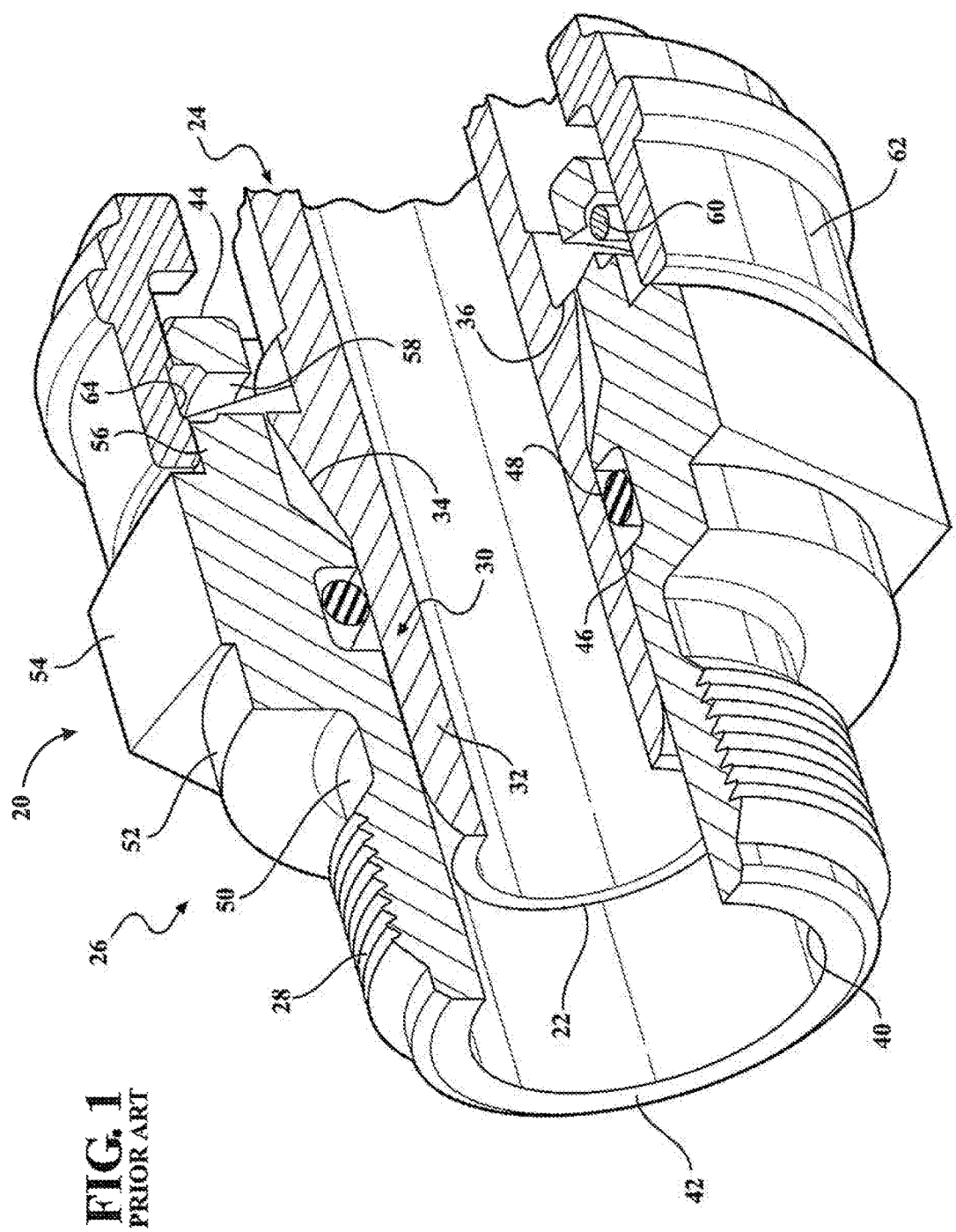
FIG. 1 is a cross-sectioned perspective view of a prior art fluid quick connector with assurance cap.
Figure 2:
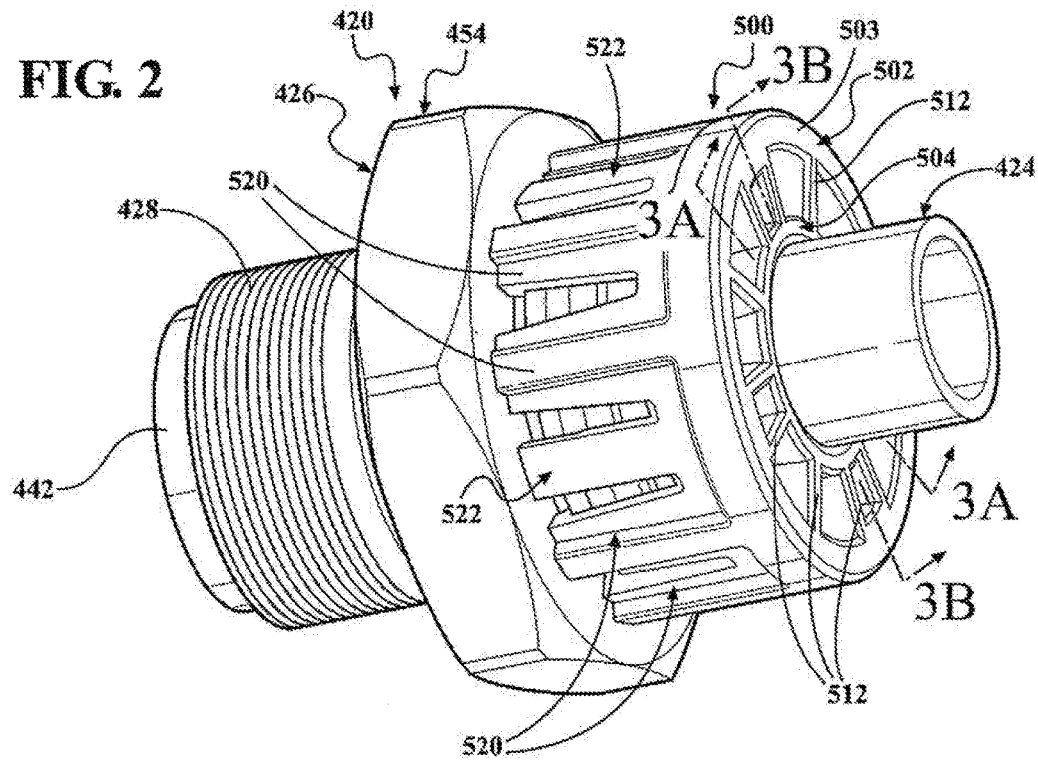
FIG. 2 is a perspective view of an assembled quick connector and assurance cap described herein.

Referring now to FIG. 1, there is depicted prior art fluid connector 20 which locks first end 22 of tubular member 24 in connector or fitting body 26 which is itself removably mountable in a port, such as by engagement of external threads 28 on one end of body 26 with internal threads in the port.

Tubular member 24 is generally made of metallic materials, but rigid plastic material may also be employed. Tubular member 24 comprises a generally constant diameter extending from first end 22.

Head section 30 extends from first end 22 at first diameter portion 32 to an outward extending endform comprising tapered raised surface 34 which terminates at a large diameter end and radially extending shoulder 36.

Connector body 26 can be, but need not necessarily be, integrally made from a single piece of metallic or plastic material. Body 26 comprises through bore 40 extending from first end 42 to opposite second end 44. Bore 40 need not have a constant diameter between first and second ends 42 and 44. Annular internal groove 46 is formed in body 26 intermediate first and second ends 42 and 44 and receives seal member 48, such as an O-ring, for sealing tubular member 24 to body 26 and to prevent fluid leakage there between.

As described above, body 26 comprises externally threaded end portion 28 spaced from first end 42. Recessed radially inward extending groove 50 can be formed in certain applications adjacent one end of threaded end portion 28 and annular collar 52 to receive a washer, not shown. Hexagonal portion 54 is formed adjacent annular collar 52. Reduced diameter receiving portion 56 comprising a generally constant diameter extends from one end of hexagonal portion 54 to second end 44 of body 26. Recessed, outward opening, annular groove 58 is formed in receiving portion 56. Groove 58 comprises a constant closed inner end facing bore 40 in body 26 which is interrupted by one or more circumferentially spaced slots.

Retainer clip 60 is mounted in groove 58. Retainer clip 60 can be, but need not necessarily be formed of a spring wire. Retainer clip 60 can be formed with inwardly extending protrusions which project through the slots in groove 58, when retainer clip 60 is in a relaxed state behind tapered shoulder 36 on tubular member 24, to lock tubular member 24 to connector body 26.

When first end 22 of tubular member 24 is inserted to receiving portion 56 of body 26, first end 22 and head section 30 of tubular member 24 slide through receiving portion 56 toward first end 42 of body 26. The inward extending protrusions on retainer clip 60 seated in groove 58 slide along tapered surface 34 on tubular member 24 causing retainer clip 60 to expand radially outward moving the protrusions on retainer clip 60 out of bore 40 until tapered shoulder 36 of tubular member 24 slides past one end of retainer clip 60. At this point, the protrusions on retainer clip 60 snap radially inward into bore 40 behind tapered shoulder 36 locking tubular member 24 in body 26. Also, at this point during the insertion process, the outermost portions of retainer clip 60 extend only slightly above the outer surface of receiving portion 56 of the body 26.

Prior art assurance cap 62 shown in FIG. 1, carried on tubular member 24, can then be slid over receiving portion 56 of body 26. Assurance cap 62 includes inward opening recess 64 which is positioned between the ends of assurance cap 62 to encompass the outer portions of retainer clip 60 extending outward from body 26 when retainer clip 60 is in the fully seated position in groove 58 behind tapered shoulder 36 of tubular member 24. This provides the installer with a visual indication that tubular member 24 is fully inserted and seated in body 26 in a fluid sealed position.

In the event that tubular member 24 is not fully inserted into body 26 such that it is not in the position shown in FIG. 1, the outer portions of clip 60 will have been pushed radially outward into a radially expanded state as clip 60 rides up along the tapered surface 34 of tubular member 24. The outer tips of the outer portions of retainer clip 60 then extend further outward beyond the outer surface of receiving portion 56 of the body 26 in an interference position with the sliding movement of assurance cap 62. This interference prevents assurance cap 62 from being slid fully forward such that recess 64 cannot snap over clip 60. Since assurance cap 62 is therefore not in a fully forward position, the installer has a visual indication that tubular member 24 is not fully inserted into body 26.

FIGS. 2-8 depict alternate assurance cap 500 mounted on fluid connector assembly 420. Fluid connector assembly 420 locks first end 422 of fluid flow tubular member or conduit 424 (hereafter "tubular member 424" at first) in connector body 426 which is itself removably mountable in a port, such as by engagement of external thread 428 on one end of body 426 with internal threads in the port of an external device, connector, housing, etc.

Tubular member 424 comprises a generally constant diameter extending from first end 422. Head section 430 extends from first end 422 at a first diameter 432 to an outward extending endform comprising tapered radially outward endform ramp portion 434 which terminates in a large diameter end and radially extending shoulder 436. Raised bead or collar 437 is formed on the exterior surface of tubular member 424 and extends axially from radially extending shoulder 436 for a short distance to end or shoulder 438 which transitions to the constant first diameter of the overall tubular member 424.

Connector body 426 comprises through bore 440 extending from first end 442 to opposite second end 444. Bore 440 may or may not have a constant diameter between first and second ends 442 and 444. Annular internal groove 446 is formed in connector body 426 intermediate first and second ends 442 and 444 and receives a seal member, such as O-ring 448, for sealing tubular member 424 to connector body 426 and to prevent fluid leakage there between.

Connector body 426 comprises external threaded end portion 428 spaced from first end 442. Radially inward extending groove 450 can be formed adjacent one end of threaded end portion 428 for receiving external seal member 451, such as an O-ring, for sealing connector body 426 to the external component. Hexagonal portion 454 is formed adjacent to recess 450.

Annular recess or groove 476 of a first diameter extends axially from one edge of hexagonal portion 454. Recess 476 terminates in a radially outward extending shoulder at one end of annular ring 470. Annular ring 470 transitions into radially inward extending ramp or conical surface 472 which transitions into an axially extending surface 466 comprising an outer diameter larger than the inner diameter of recess 476. Axial surface 466 transitions into recess or groove 468. Groove 468 includes a plurality of circumferentially spaced apertures 469, with three apertures being employed, for example, for three-protrusion retainer clip 460. Recess 468 transitions into larger diameter end annular ring 464 which extends to second end 444 of body 426.

Resilient retainer clip 460 ("clip 460") mounted in groove 468 can be, but need not necessarily be formed of a single piece of spring wire. Clip 460 can be formed with a plurality of radially inward extending protrusions which project through slots or apertures 469 in groove 468 when clip 460 is in a relaxed state behind the radially extending shoulder 436 on tubular member 424 to lock tubular member 424 to connector body 426. At the same time, clip 460 can be in a relaxed state prior to insertion of tubular member 424 into open insertion second end 444 of connector body 426.

When first end 422 of tubular member 424 is inserted into open second end 444 of connector body 426, first end 422 and head section 430 of tubular member 424 slide through the aperture in bore 440 at second end 444 of connector body 426 toward first end 442 of connector body 426. The inwardly extending protrusions on clip 460 slide along tapered endform ramp portion 434 on tubular member 424 causing clip 460 to expand radially outward moving the protrusions on resilient clip 460 out of groove 468 until radially extending shoulder 436 on the end of outward tapered endform ramp portion 434 of tubular member 424 slide past one end of clip 460. At this point, the protrusions on clip 460 snap radially inward into bore 440 in connector body 426 behind radially extending shoulder 436 locking tubular member 424 in connector body 426.

As shown in FIGS. 2-8, assurance cap 500 is in the form of a one-piece body, which may be molded, machined or otherwise formed out of plastic, metal, such as aluminum, etc.

Assurance cap 500 is formed with first outer annular ring 502 at first end 503. Inner support ring 504, generally in the form of a cylindrical annular member, comprises first end 506 generally disposed coplanar with first end 503 of first annular outer ring 502 and second opposed end 508 spaced a distance by a tubular wall of inner support ring 504 from the first end 506 of the inner support ring 504. Inner support ring 504 includes a hollow interior defining through bore 510 extending between first and second ends 506 and 508.

Figure 5:
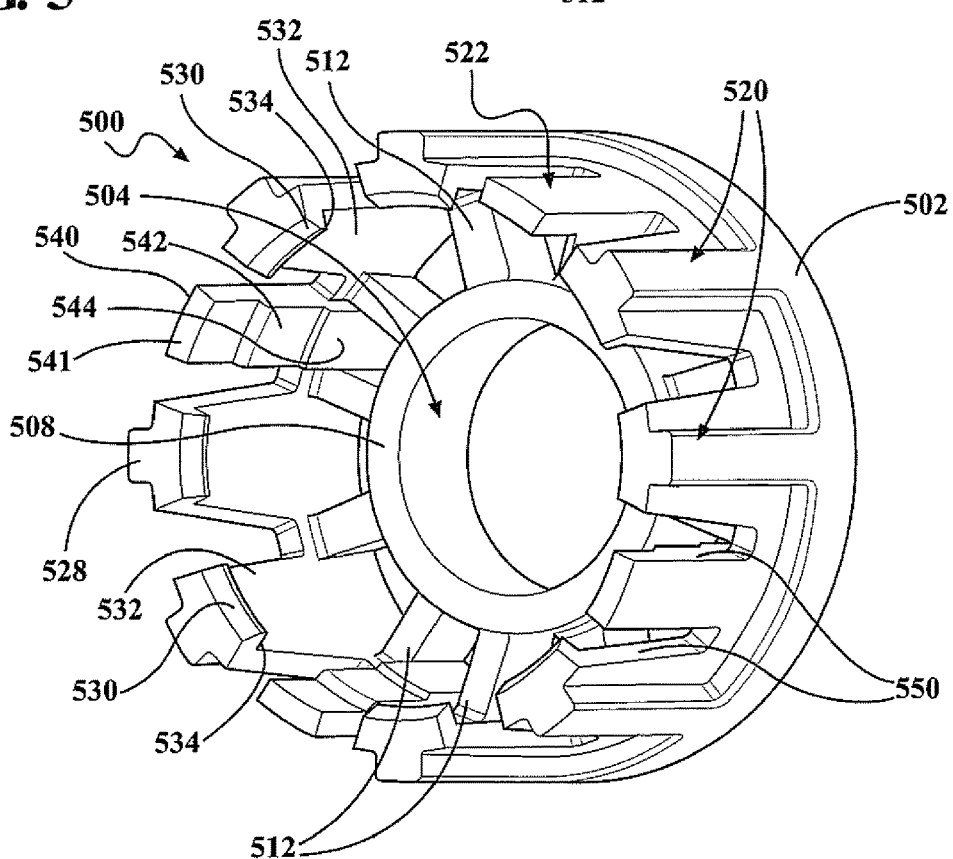
FIG. 5 is a perspective view from the opposite end of the assurance cap shown in FIG. 4.
Figure 6:
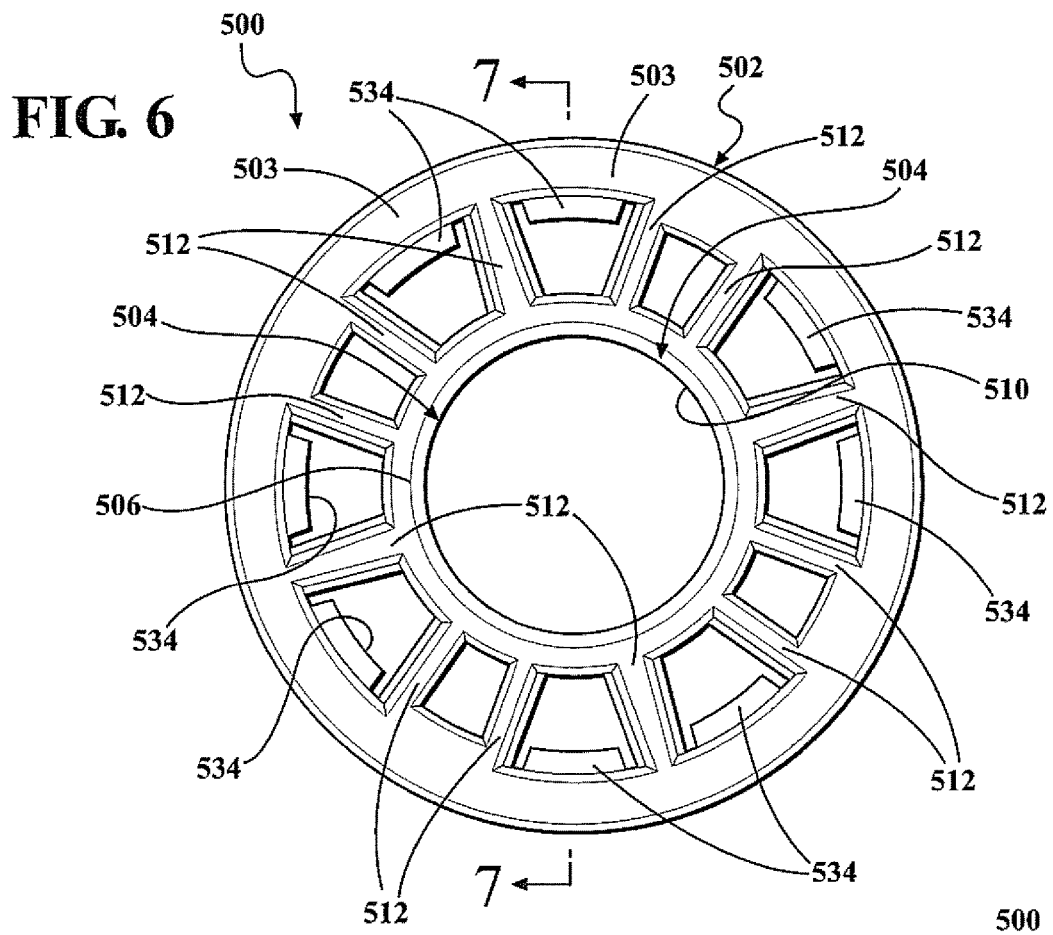
FIG. 6 is an end view of the assurance cap shown in FIG. 4.
Figure 7:
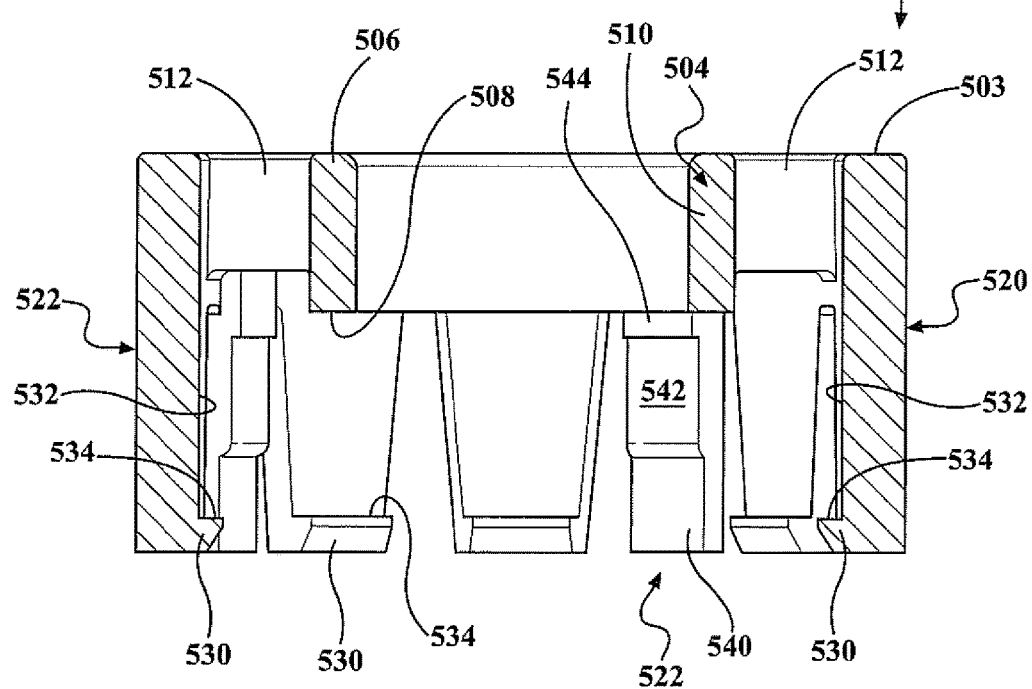
FIG. 7 is a cross-sectional view generally taken along line 7-7 in FIG. 6.

A plurality of radially extending ribs 512 form spokes extending radially outward between inner support ring 504 and first outer annular ring 502. Ribs 512 are circumferentially spaced about the first end of first outer annular ring 502 and have an overall length extending from first end 503 of first outer annular ring 502 and first end 506 of inner support ring 504 for a predetermined distance less than the length of inner support ring 504 as shown in FIGS. 5 and 7.

A plurality of primary latch fingers 520 and a plurality of stepped fingers 522 are formed on the body of assurance cap 500 and are arranged in an annular, circumferential spaced, arrangement extending parallel to the longitudinal axis of assurance cap 500 from first annular ring 502 at first end 503 of assurance cap 500.

Primary latch fingers 520 and stepped fingers 522 are arranged in a generally alternating arrangement around the periphery of first end 503 of assurance cap 500. Although primary latch fingers 520 and stepped fingers 522 may alternate in a circumferentially spaced side-by-side arrangement of one primary latch finger 520 located between two stepped fingers, by example only, as shown in FIGS. 4-7, two primary latch fingers 520 are arranged in a spaced side-by-side pair between single stepped fingers 522. This arrangement of two primary latch fingers 520 between two spaced stepped fingers 522 continues in a circumferential consecutive manner about the periphery of the body of assurance cap 500.

Primary latch fingers 520 are formed of an axially extending member with a generally planar, slightly arcuate leg 524 which is recessed a short distance below the outer periphery of first outer annular ring 502. Elongated rib or structural support 526 is integrally formed on leg 524 and projects axially from the outer peripheral edge of annular ring 502. Rib 526 provides structural support for leg 524 of primary latch fingers 520 while still allowing flexure of primary latch fingers 520 as described hereafter.

Leg 524 of each primary latch finger 520 terminates in outer end 528. Projection 530 is formed on outer end 528 of primary latch fingers 520 and projects radially inward from inner surface 532 of primary latch finger 520 to form shoulder 534 extending radially inward from outer end 528 of primary latch finger 520.

Stepped fingers 522 have outmost first step 540 which terminates in outer end 541 contiguous with outer end 528 of each primary latch finger 520. Second step 542 is disposed axially adjacent first step 540 and comprises an inner surface disposed radially inward of the inner surface of first step 540. Third step 544 is disposed axially adjacent second step 542 and includes an inner surface disposed radially inward of the inner surface of second step 542.

Primary latch fingers 520 and stepped fingers 522 are circumferentially spaced apart by slots 550 which open at first ends 528 and 541 of primary latch fingers 520 and stepped fingers 522, respectively. Slots 550 are generally axially aligned with ribs 512. Slots 550 provide a degree of flexibility to primary latch fingers 520 and stepped fingers 522.

Figure 3A:
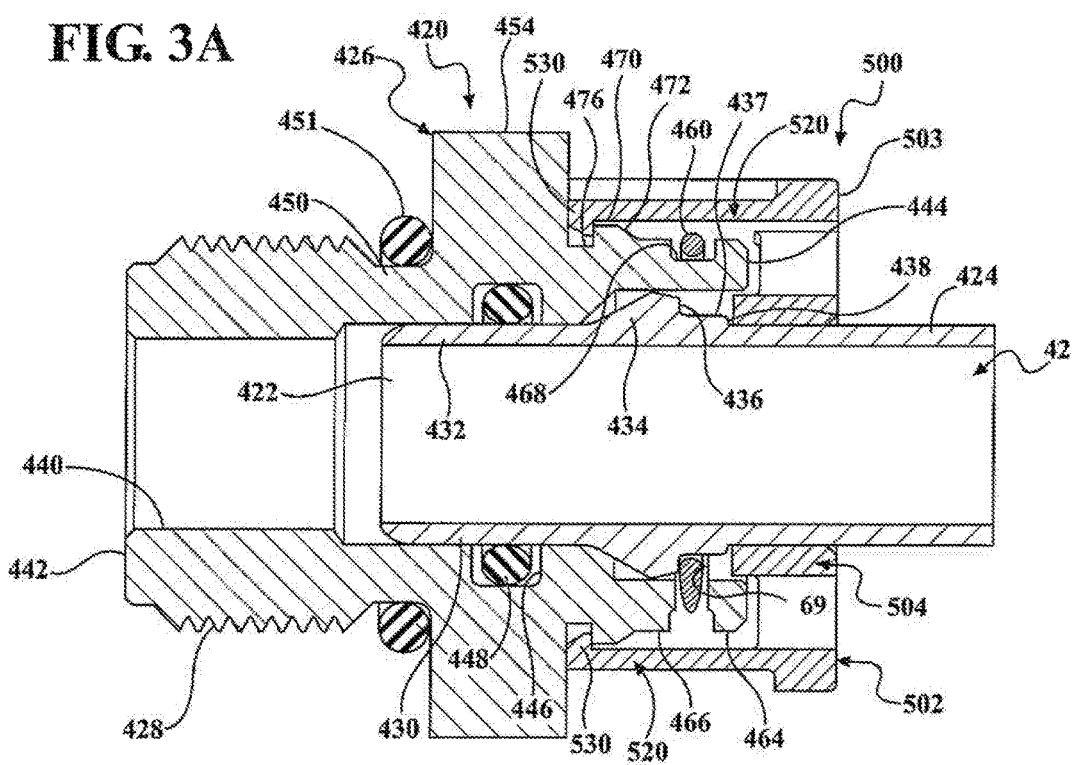
FIG. 3A is a longitudinal cross-sectional view generally taken along line 3A-3A in FIG. 2.
Figure 3B:
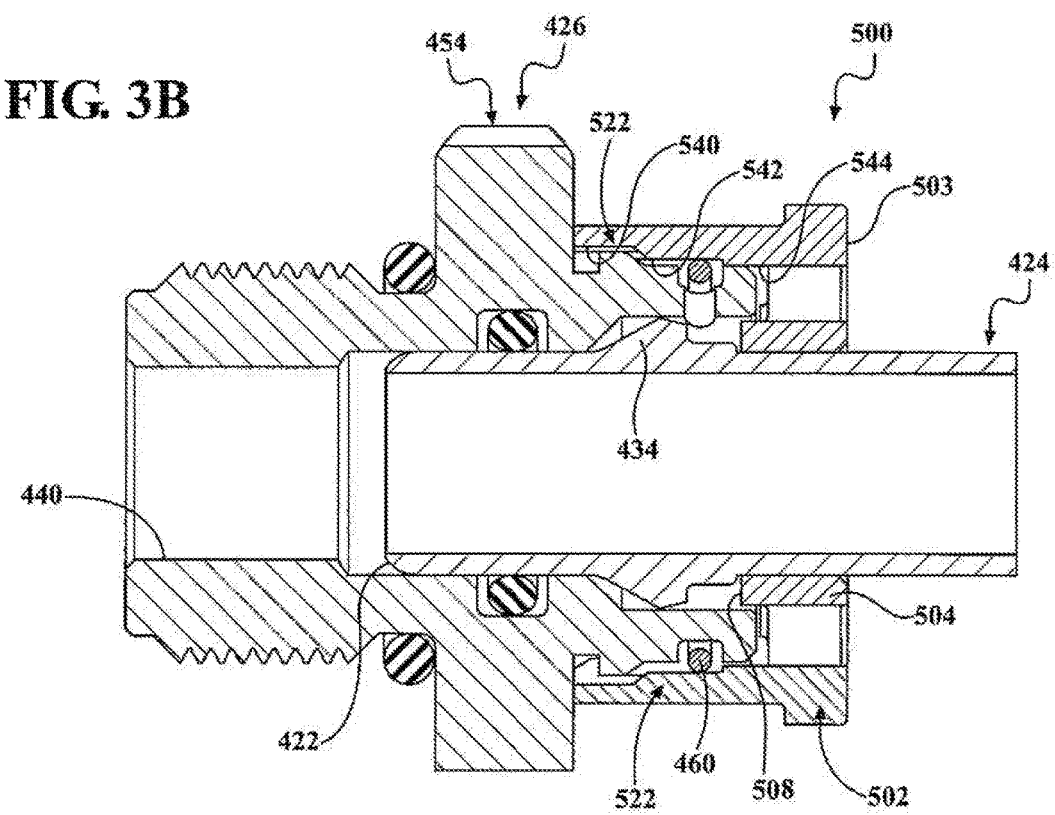
FIG. 3B is a longitudinal cross-sectional view generally taken along line 3B-3B in FIG. 2.
Figure 4:
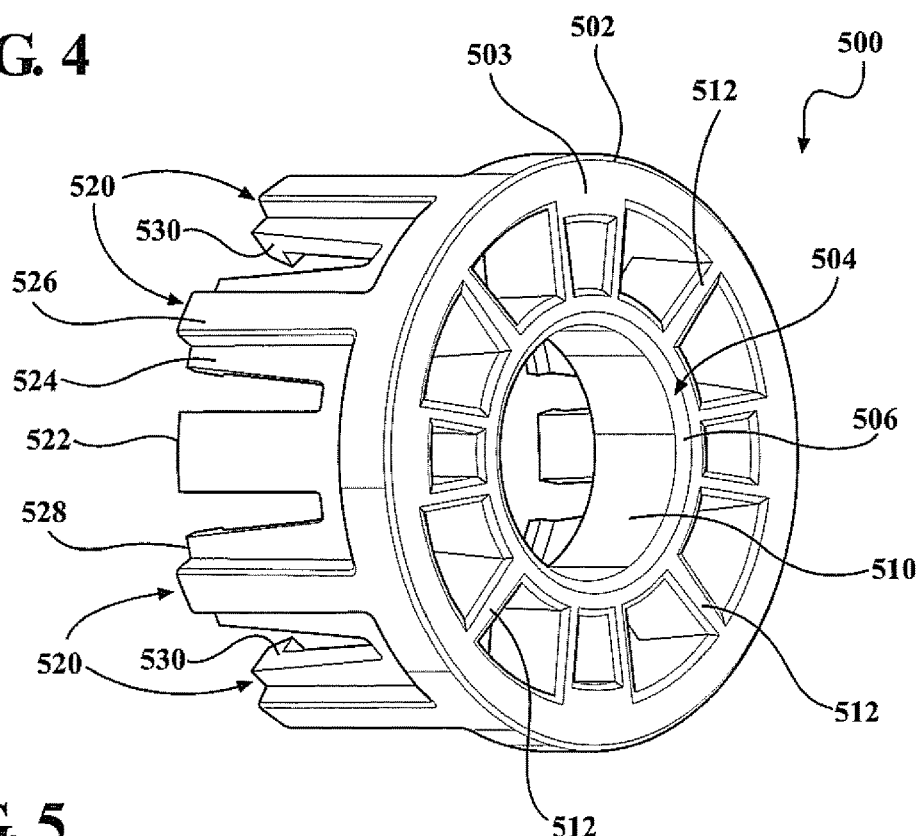
FIG. 4 is a perspective view of a right end of the assurance cap shown in FIG. 2.
Figure 8:
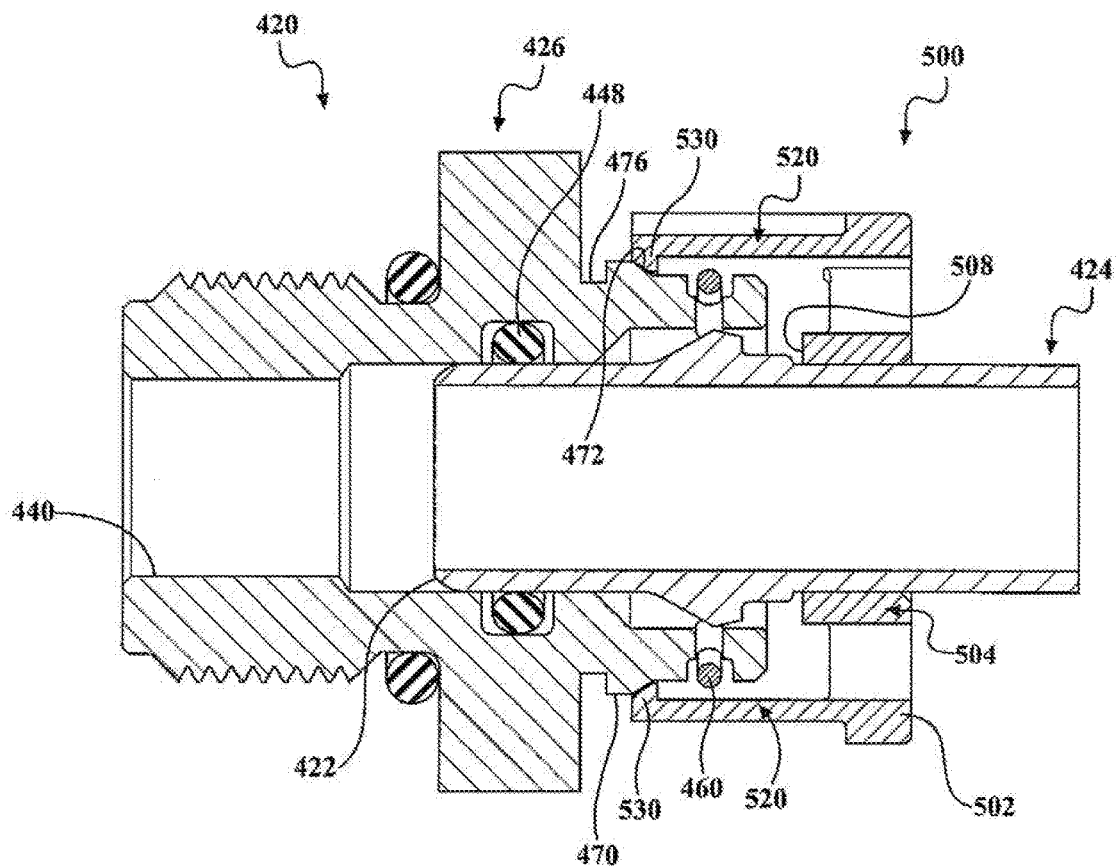
FIG. 8 is a longitudinal cross-sectional view showing the position of the assurance cap and quick connector body when the tubular member is not fully inserted into the quick connector body.

Referring to FIGS. 3B and 8, assurance cap 500 is first installed over tubular member 424 from either end of tubular member 424 prior to formation of endform ramp portion 434 adjacent first end 422 of tubular member 424. Endform ramp portion 434 slidably captures assurance cap 500 on tubular member 424.

Alternately, assurance cap 500 may be inserted over tubular member 424 from the end of tubular member 424 opposite first end 422 prior to the connection of the opposite end of tubular member 424 to another component. Endform ramp portion 434, in this alternate installation, can be pre-formed on tubular member 424 prior to the mounting of assurance cap 500 from the opposite end of tubular member 424.

When tubular member 424 is to be coupled to quick connector body 426, first end 422 of tubular member 424 is inserted through open first end 444 of connector body 426. The ramp surface of endform ramp portion 434 of tubular member 424 will engage the radially inward extending projection on clip 460 and force the entire clip radially outward until, when first end 422 of tubular member 424 is fully inserted into bore 440 in connector body 426, the projections on clip 460 snap radially inward to their relaxed normal state behind radially extending shoulder 436 on endform ramp portion 434 on tubular member 424.

With tubular member 424 locked to connector body 426 by clip 460, the operator can slide assurance cap 500 toward hex portion 454 of quick connector body 426. Projections 530 on outer ends 528 of primary latch fingers 520 will engage ramp surface 472 on connector body 426 forcing the ends of primary latch fingers 520 radially outward. When assurance cap 500 is in the fully forward position, projections 530 snap into recess or groove 476 on connector body 426 latching assurance cap 500 to quick connector body 426. At the same time, as shown in FIG. 3B, second step 542 of each stepped finger 522 will be located circumferentially over the outer surface of clip 460. This arrangement holds clip 460 in its normal non-expanded state and prevents expansion of clip 460 due to any axial separation forces exerted on connector body 426 and/or tubular member 424 tending to disengage or separate connector body 426 and tubular member 424. Stepped fingers 552 thereby act as an axillary latch for assurance cap 500.

The arrangement of a pair of primary latch fingers 520, one stepped fingers 522, pair of primary latch fingers 520, etc. about the circumference of assurance cap 500 enables one or two stepped fingers 522 to be in contact with clip 560 at all annular positions of assurance cap 500 relative to quick connector body 426.

When projections 530 on primary latch fingers 520 are in the fully latched position in groove 476 on quick connector body 426, inner end 508 of inner support ring 504 will be in engagement with shoulder 438 on raised bead or flange 437 on tubular member 424. This serves as a secondary latch function securing assurance cap 500 to connector body 426 and tubular member 424 in the fully inserted position of tubular member 424 in connector body 426 between engaged projections 530 of primary latch fingers 520 in groove 476 and engaged inner end 508 of inner support ring 504 with flange 437 on tubular member 424.

Referring briefly to FIG. 8, the primary function of assurance cap 500 is to insure that tubular member 424 is fully inserted into quick connector body 426 so that tubular member 424 can be latched in place by clip 460. During the insertion of tubular member 424 into bore 440 in quick connector body 426, the installer may feel resistant to forward insertion movement of tubular member 424 into bore 440 when, for example, first end 422 of tubular member 424 contacts O-ring 448 in the interior of quick connector body 426. This may give a false full insertion indication to the installer. However, assurance cap 500 is configured so that at all non-fully inserted position of tubular member 424 relative to quick connector body 426, projections 530 on ends 528 of primary latch fingers 520 will not be fully latched in recess or groove 476 in connector body 426; but rather, will be in engagement with ramp surface 472 on radial outer surface 470 on connector body as shown in FIG. 8. This prevents latching of primary latch fingers 520 to quick connector body 426. A non-fixed position of body 426 or a slight pull-out movement by the installer exerted on assurance cap 500 moving assurance cap 500 away from body 426 will provide an indication of non-latching of assurance cap 500 to quick connector body 426.

At the same time, assurance cap 500, due to the rib support structure of primary latch fingers 520 and the number of such primary latch fingers 520 on assurance cap 500 and primary latching of projections 530 of primary latch fingers 520 in groove 476 of quick connector body 426 and engagement of inner end 508 of inner support ring 504 with shoulder 438 on radially extending shoulder 436 on tubular member 424, provides a resistance force sufficient to prevent axial separation of tubular member 424 from quick connector body 426 despite any axial separation forces acting on quick connector body and tubular member 424.

Figure 9:
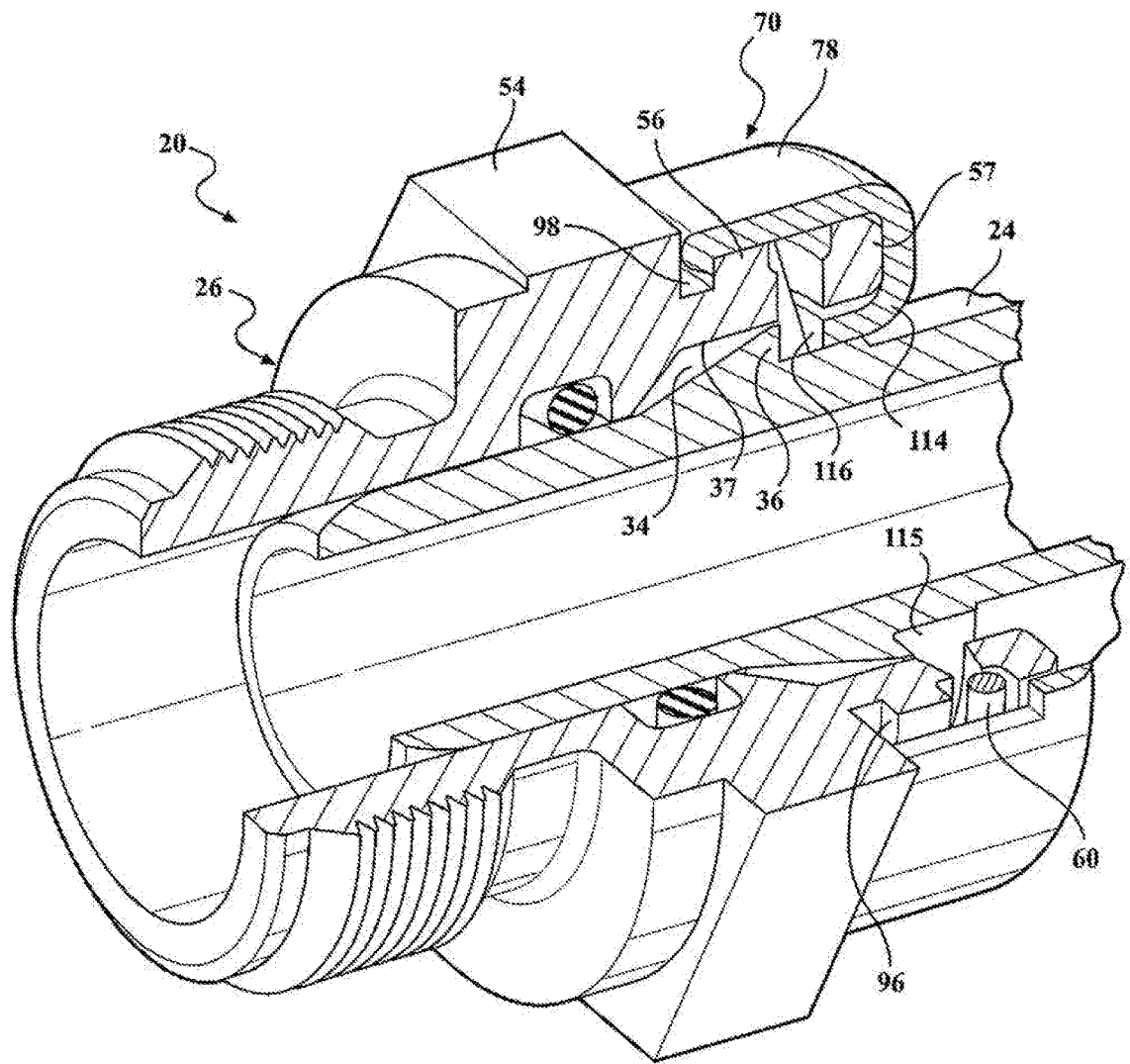
FIG. 9 is a partially cross-sectioned perspective view of a quick connector body with another aspect of an assurance cap.
Figure 10:
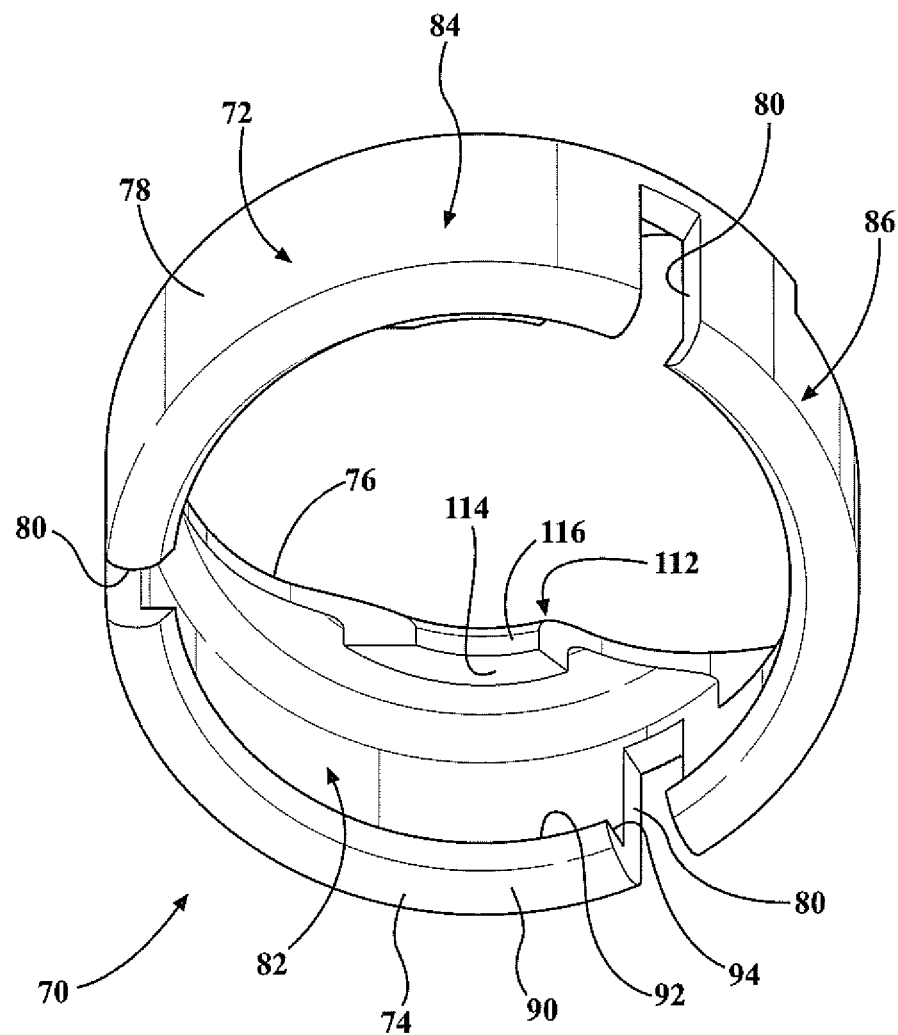
FIG. 10 is a perspective view of one end of the assurance cap shown in FIG. 9.
Figure 11:
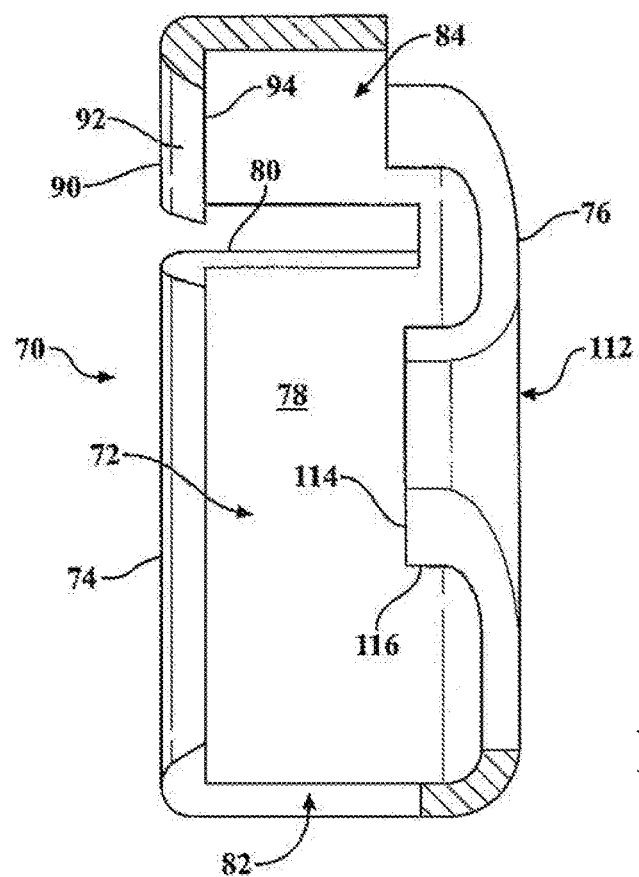
FIG. 11 is a partially cross-sectioned side elevation view of the assurance cap shown in FIG. 10.
Figure 12:
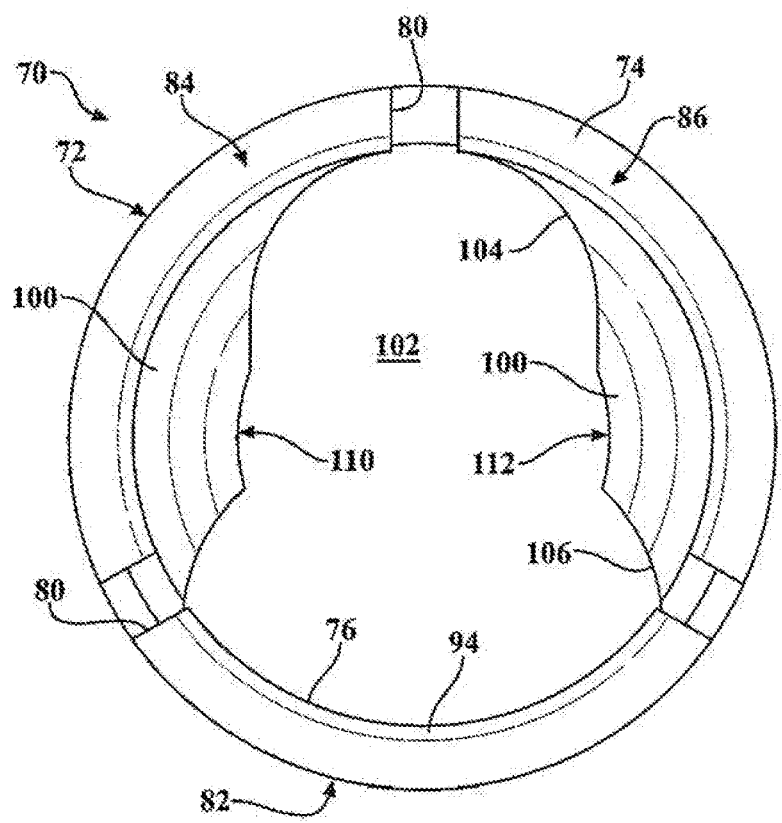
FIG. 12 is a view of an opposite end of the assurance cap shown in FIG. 10.
Figure 13:
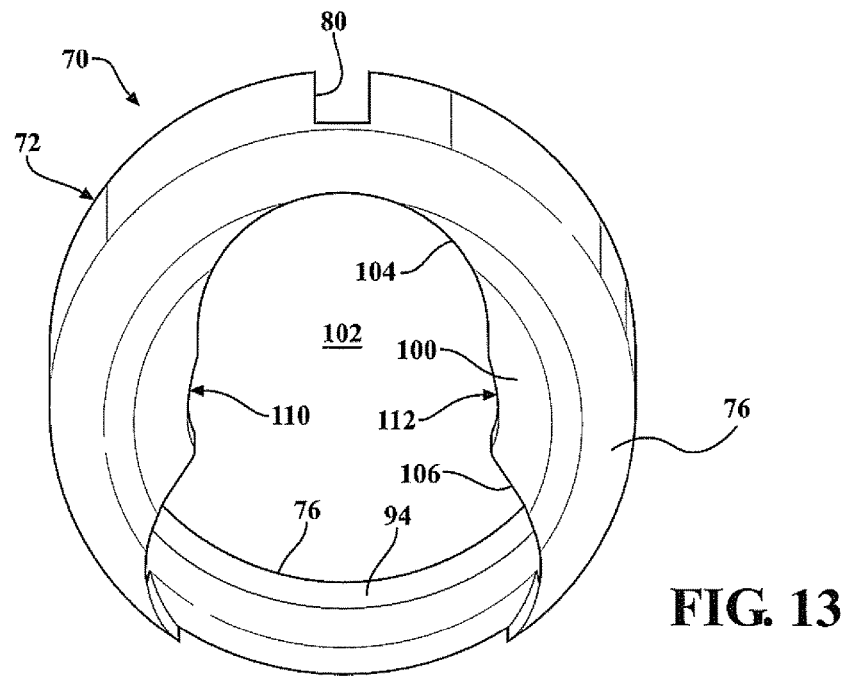
FIG. 13 is a perspective view of an opposite end of the assurance cap shown in FIGS. 10-12.
Figure 14:
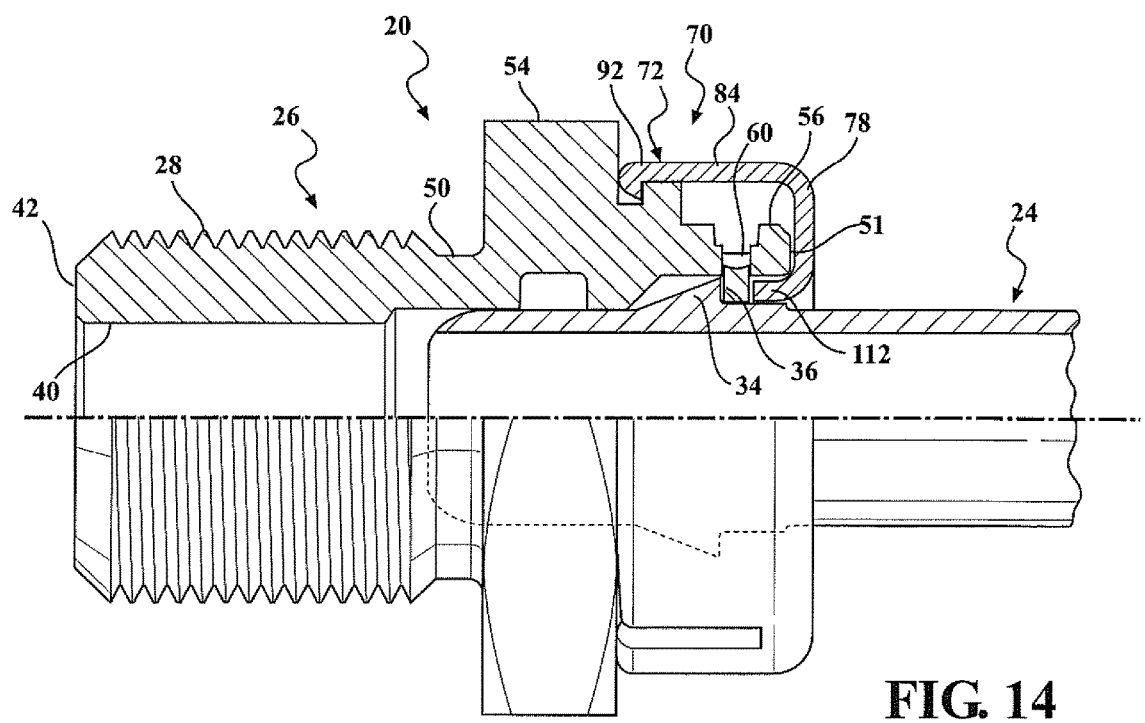
FIG. 14 is a longitudinal cross-sectional view showing the fully latched position of the assurance cap of FIGS. 9-13 on the quick connector body.

FIG. 9 depicts fluid connector 20 of FIG. 1 which is used to sealingly lock the tubular member 24 to the body 26. However, fluid connector 20 in FIG. 9 includes novel assurance cap 70 which provides assurance of a full insertion of tubular member 24 into body 26 and, at the same time, provides secondary latches to hold assurance cap 70 on body 26 and to provide an additional latching force against disengagement of tubular member 24 from body 26.

Assurance cap 70, shown in an assembled position in FIG. 9 and in detailed views in FIGS. 10-14 and FIGS. 15A-15D, can be formed of a material having a suitable strength, such as high strength plastic, or a metal, such as stainless steel, aluminum, etc.

In this aspect, assurance cap 70 is in the form of annular body 72 comprising first end 74, opposed second end 76, and intermediate sidewall 78 extending between first and second ends 74 and 76. At least one or a plurality of slots 80, with three slots 80 shown by example, are formed through first end 74 and a portion of sidewall 78 to separate sidewall 78 into a plurality of fingers with three fingers 82, 84 and 86 being shown by example in FIGS. 10-14. Slots 80 and intervening fingers 82, 84, and 86 provide flexibility to assurance cap 70 allowing first end 74 of assurance cap 70 to flex radially outward over the outer surface of receiving portion 56 of body 26 until assurance cap 70 has reached its fully forward position of movement, as described hereafter.

First end 74 of each of fingers 82, 84, and 86 comprises rounded over end portion 90 which terminates in radially inward extending edge 92 forming shoulder 94. Shoulder 94 is configured to snap over and engage mating shoulder 96 formed along one side of open ended annular groove 98 formed in body 26 between hexagonal portion 54 and receiving portion 56 of body 26. Shoulders 94 on each of the three fingers 82, 84, and 86, which extend over substantially the entire circumference of assurance cap 70, provide a secure circumferential secondary latching force to secure assurance cap 70 on body 26 as well as providing additional latching force to resist separation of tubular member 24 from body 26.

Second end 76 of assurance cap 70 comprises a partially closed, irregularly shaped endwall 100 which includes keyhole shaped aperture 102 comprising reduced diameter or width first end portion 104 and larger diameter second end portion 106. The walls forming first end portion 104 and second end portion 106 are generally arcuate to enable assurance cap 70 to be mounted over first end 22 of tubular member 24 as described hereafter and shown in FIGS. 15A-15D.

Diametrically opposed, inward extending fingers 110 and 112 are provided generally centrally in endwall 100 on second end 76 of assurance cap 70. Fingers 110 and 112, with only finger 112 shown in FIG. 10, have inward curled wall 114 terminating in inner edge wall 116. As shown in FIG. 9, wall 114 is generally parallel to intermediate sidewall 78 of assurance cap 70, with inner edge wall 116 facing, but spaced from resilient clip 60.

Edge walls 114 will rest on raised bead 115 on tubular member 24 extending from tapered shoulder 36 at the fully inserted position of tubular member 24 in body 26 latching assurance cap 70 on body 26 between shoulders 94 on fingers 82, 84 and 86 and fingers 110 and 112.

Fingers 110 and 112 provide an additional engagement or latching function for assurance cap 70 on fluid connector 20 when assurance cap 70 is in the full forward, latched position shown in FIG. 9.

Figure 15A:
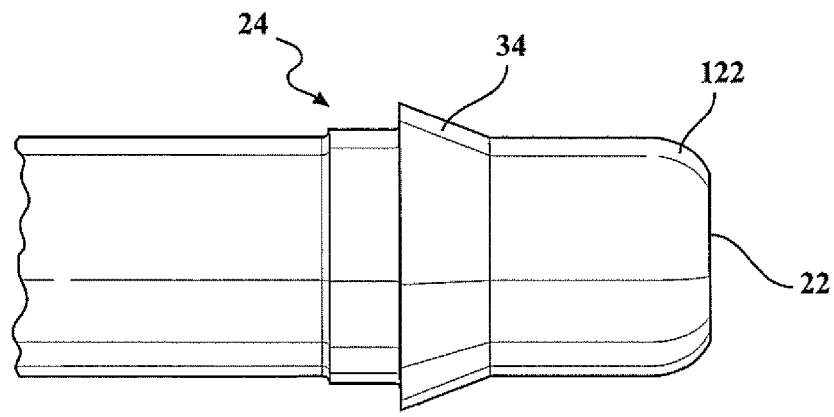
FIG. 15A is a side elevational view of a fluid tube insertable into the quick connector body.
Figure 15B:
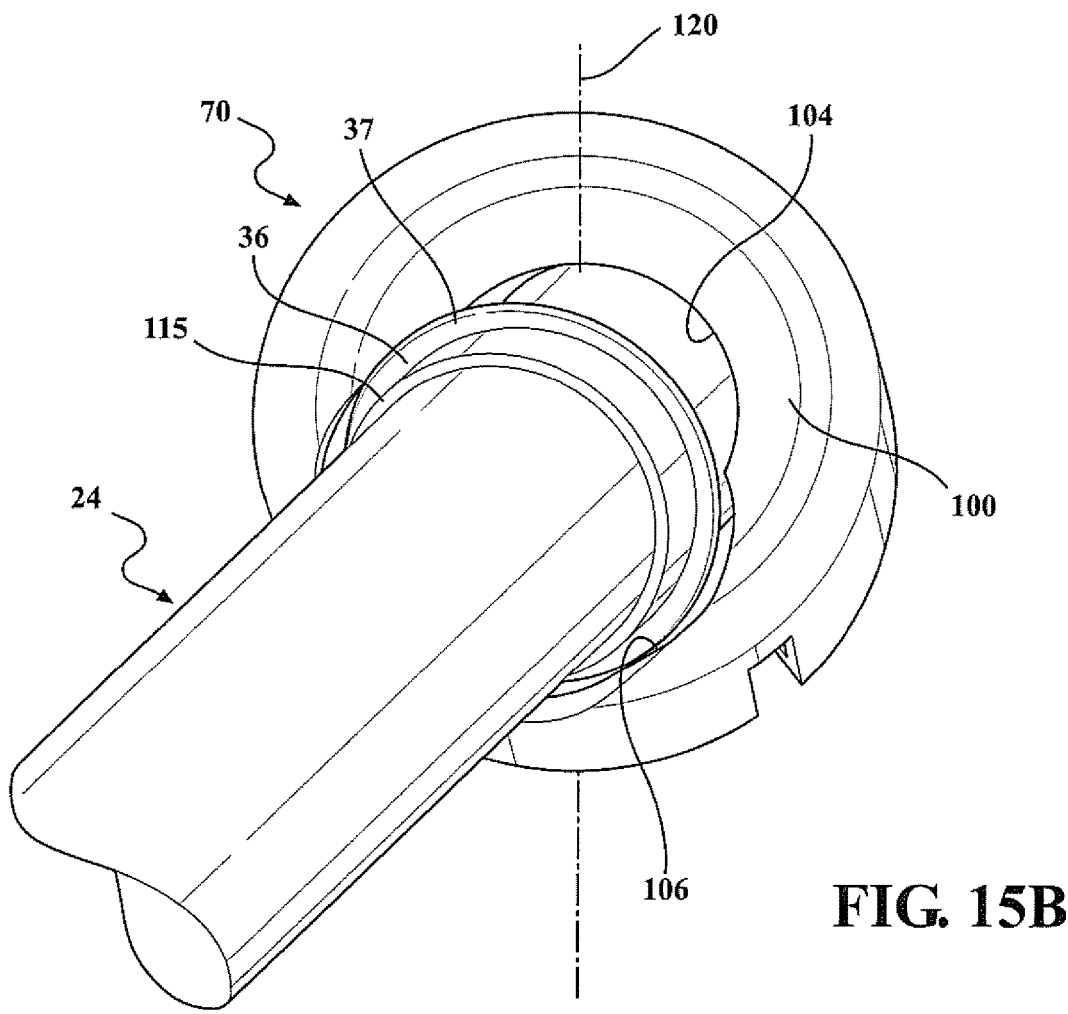
FIGS. 15B, 15C, and 15D are a perspective view showing the installation of the tubular member shown in the assurance cap of FIGS. 9-13 to pre-mount the assurance cap on the tubular member.

FIGS. 15A-15D depict the orientation of tubular member 24 and assurance cap 70 for mounting of assurance cap 70 over first end 22 of tubular member 24 and tapered surface 34. At the time of assembly, assurance cap 70 is oriented as shown in FIG. 15B with longitudinal axis 120 extending through keyhole shaped aperture 102 oriented at an angle along axis line 122 of tubular member 24 in FIG. 15A to bring larger diameter or width second end portion 106 of keyhole shaped aperture 102 over large diameter end 37 of tapered surface 34 of tubular member 24.

Figure 15C:
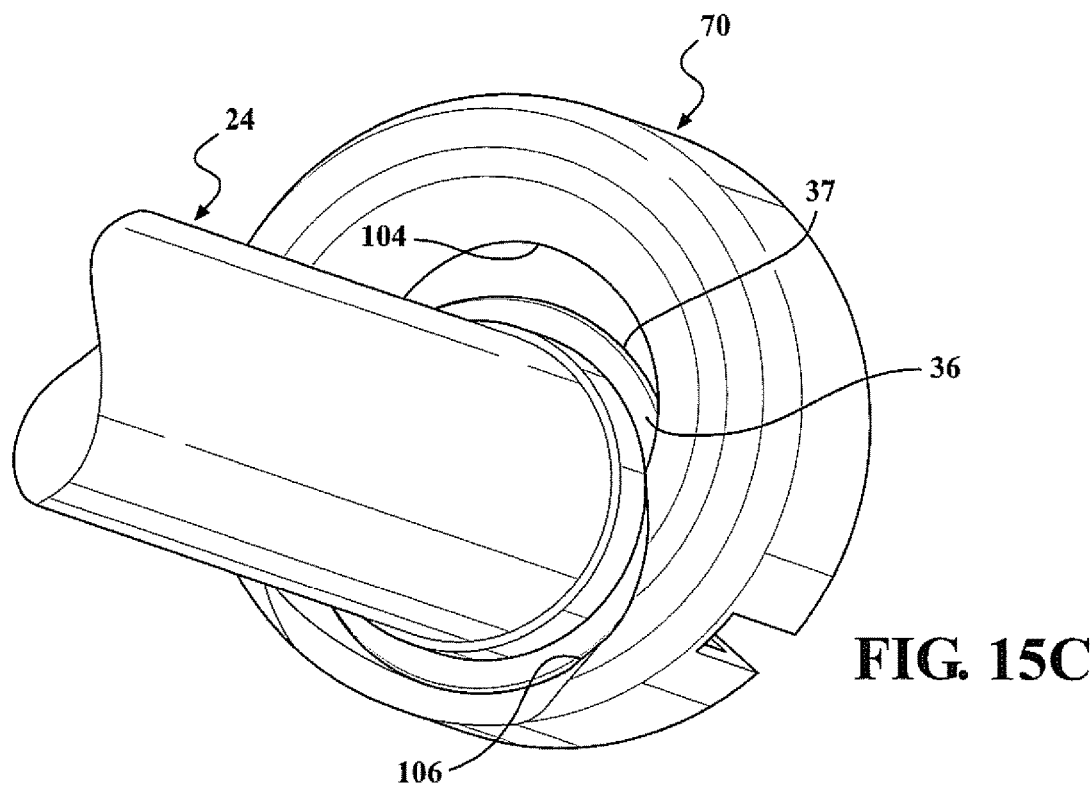

The other end of assurance cap 70 can then be pivoted in the direction of arrow 124 in FIG. 15C to move entire keyhole shaped aperture 102 over large diameter end 37 of tapered surface 34 of tubular member 24 until first end 74 of assurance cap 70 clears large diameter end 37 of tapered surface 34 of tubular member 24.

Figure 15D:
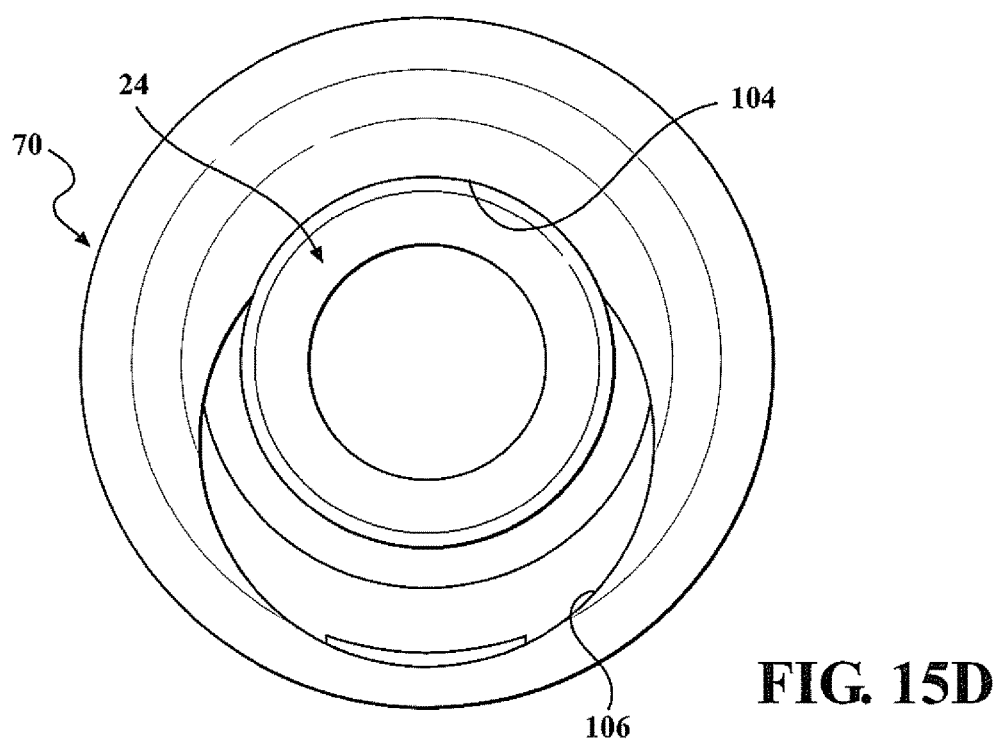

After large diameter end 37 of tapered shoulder 36 of tubular member 24 has been urged past the inner edges of large diameter end portion 106 of keyhole aperture 102 in assurance cap 70, assurance cap 70 can be tilted upward toward a perpendicular orientation with respect to a longitudinal axis of tubular member 24 and moved longitudinally along tubular member 24 until the inner edges of keyhole shaped aperture 102 are completely past large diameter end 37 of tapered surface 34 of tubular member 24, as shown in FIG. 15C. Assurance cap 70 can then be urged or slid into smaller diameter first end portion 104 of keyhole shaped aperture 102 to center assurance cap 70 with respect to tubular member 24 as shown in FIG. 15D.

Figure 16C:
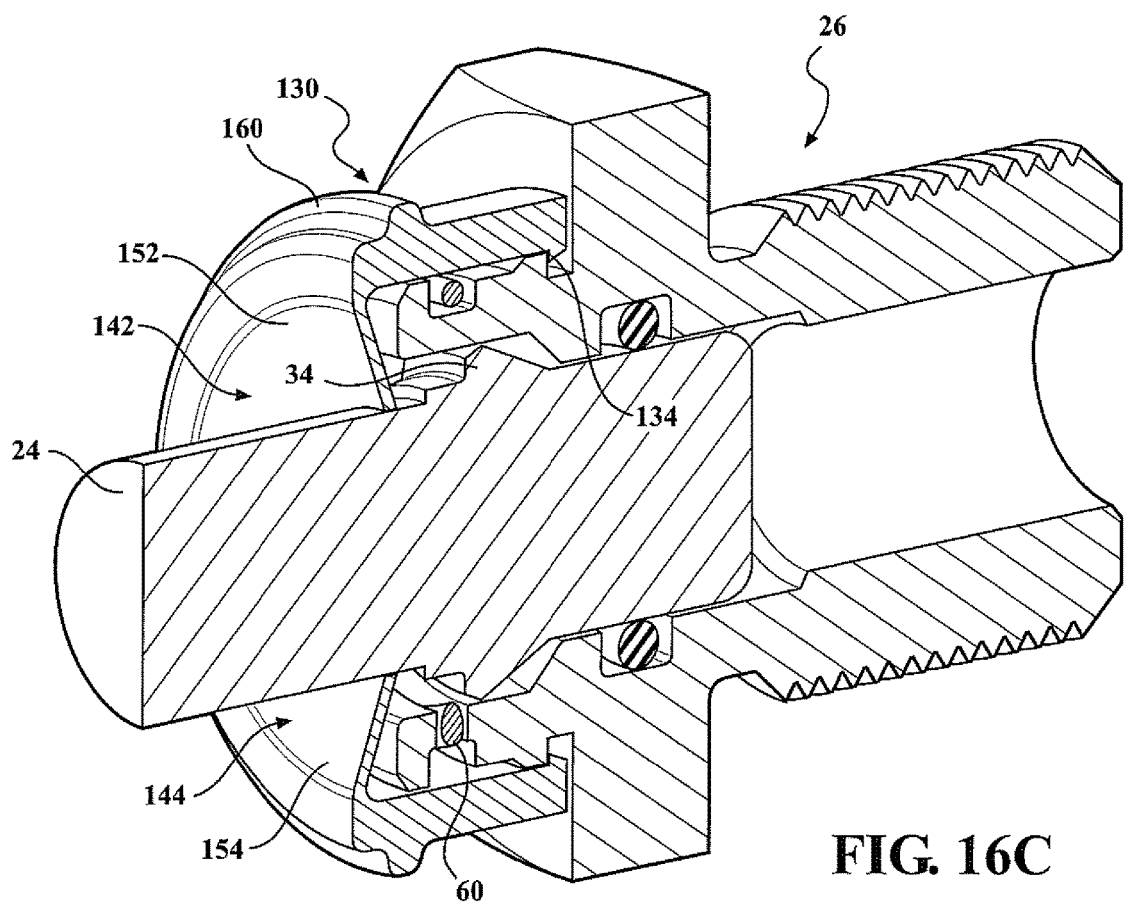
FIG. 16C is a longitudinal cross-sectioned, perspective view of the assurance cap shown in FIGS. 16A and 16B mounted on a tubular member fully inserted mounting position on a quick connector body.

Referring now to FIGS. 16A, 16B and 16C, there is depicted another aspect of assurance cap 130 which functions in the same manner as assurance cap 70 described above and shown in FIGS. 9-15D. Assurance cap 130 includes a plurality of longitudinally extending, spaced fingers 132, each with radially inward extending edge 134 terminating in shoulder 136 configured to latchably engage edge 96 of groove 98 in fluid connector 20 to secure assurance cap 130 in position at its forward most position of movement relative to tubular member 24 and body 26. It should be noted that instead of three longer circumferential length fingers 82, 84, and 86, fingers 132 in assurance cap 130 are smaller in length and greater in number to provide a greater degree of flexibility to enable assurance cap 130 to be easily slid over the raised end of receiving portion 56 of body 26.

Assurance cap 130 comprises a body with hinge 140 interconnecting first body section 142 with second body section 144. First and second body sections 142 and 144 are pivotally movable with respect to each other about hinge 140 from an open position shown in FIG. 16B which enables assurance cap 130 to be mounted over tubular member 24 to a closed position forming a continuous body about tubular member 24 by pivotal movement of first and second body sections 142 and 144 toward each other about hinge 140 until latch finger 146 on second body section 144 engages latch recess 148 in opposite first body section 142 as shown in FIG. 16B. The engagement of latch finger 146 in latch recess 148 locks first and second body sections 142 and 144 of assurance cap 130 into a continuous body encircling tubular member 24.

It should also be noted that the second end of assurance cap 130 comprises a radially inward extending skirt formed of first skirt portion 152 on first body section 142 of assurance cap 130 and second skirt portion 154 on second body section 144 of assurance cap 130. Arcuate inner edges 156 and 158 respectively on first and second skirt portions 152 and 154 form a continuous annular edge configured to engage or be slightly spaced from the outer surface of tubular member 24 when assurance cap 130 is slid to its forward most position over tubular member 24 and latched to body 26 as shown in FIG. 16C. First and second skirt portions 152 and 154 also act to center assurance cap 130 about tubular member 24 during the forward sliding movement of assurance cap 130.

Raised annular rib 160 is formed on the outer surface of assurance cap 130 between the first and second ends to act as a gripping surface to facilitate movement of assurance cap 130 from a rest position about tubular member 24 to its forward position shown in FIG. 16C.

The two-part hinged cap described above and shown in FIGS. 16A-16B may be applied to any of the other assurance caps described herein. Particularly, assurance cap 500 described above and shown in FIGS. 2-8 can be split into two hinged body section by a slit along one of the slots 550, annular ring 502 at first end 503 of assurance cap 500 and inner support ring 504. This hinged arrangement for assurance cap 500 enables assurance cap 500 to be snapped around tubular member 424 after endform ramp portion 434 has been formed on tubular member 424.

Figure 17A:
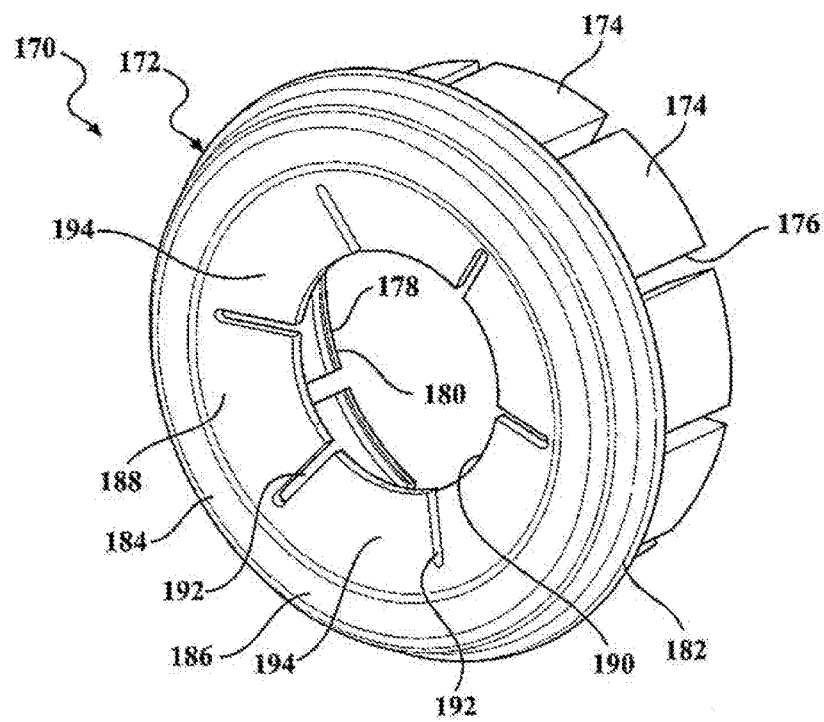
FIG. 17A is a perspective view of another aspect of an assurance cap.
Figure 17B:
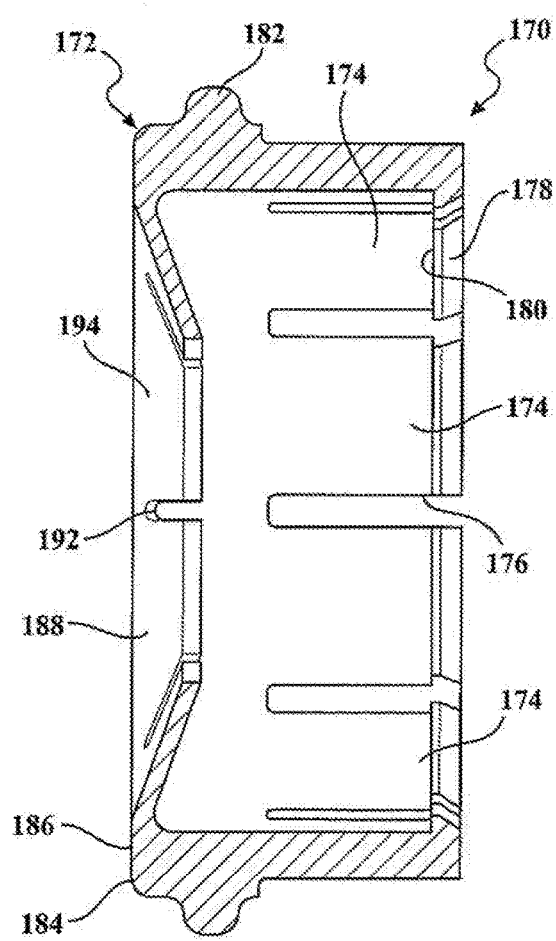
FIG. 17B is a cross-sectional view of the assurance cap shown in FIG. 17A.

FIGS. 17A and 17B show another modification in assurance cap 170. In this aspect, assurance cap 170 comprises a unitary, close annular, one-piece cylindrical-shaped body 172. The first end of body 172 comprises a plurality of fingers 174 spaced apart by longitudinally extending slots 176. Inward extending edges 178 terminating in radially inward extending shoulder 180 extend from one end of each of the fingers 174 to engage edge 96 of groove 98 in body 26 to latch assurance cap 170 to body 26 in a forward most position of movement indicating full insertion of tubular member 24 in body 26.

Annular radially outward extending ring 182 is formed intermediate the first end and opposed second end of body 172 to act as a gripping surface to facilitate movement of assurance cap 170.

Second end 184 of body 172 includes continuous annular outer ring 186 and radially inward conical-shaped skirt 188 extending from outer ring 186 to inner edge 190. A plurality of radially extending slots 192 are formed in skirt 188 and extend from the inner edge 190 partially through the radial extent of skirt 188. Slots 192 divide 188 into a plurality of radially inward, conically tapered fingers 194. Slots 192 provide flexibility to fingers 194 to enable assurance cap 170 to be forcibly urged over large diameter end portion 37 of tapered surface 34 on tubular member 24 to mount assurance cap 170 on tubular member 24 prior to insertion of tubular member 24 into body 26.

Figure 18A:
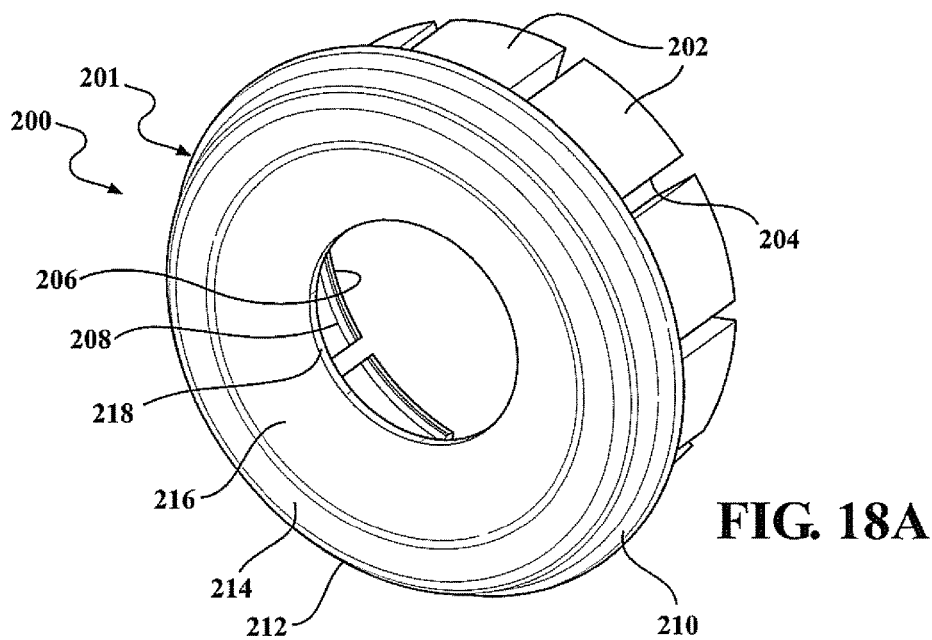
FIG. 18A is a perspective view of another aspect of an assurance cap.
Figure 18B:
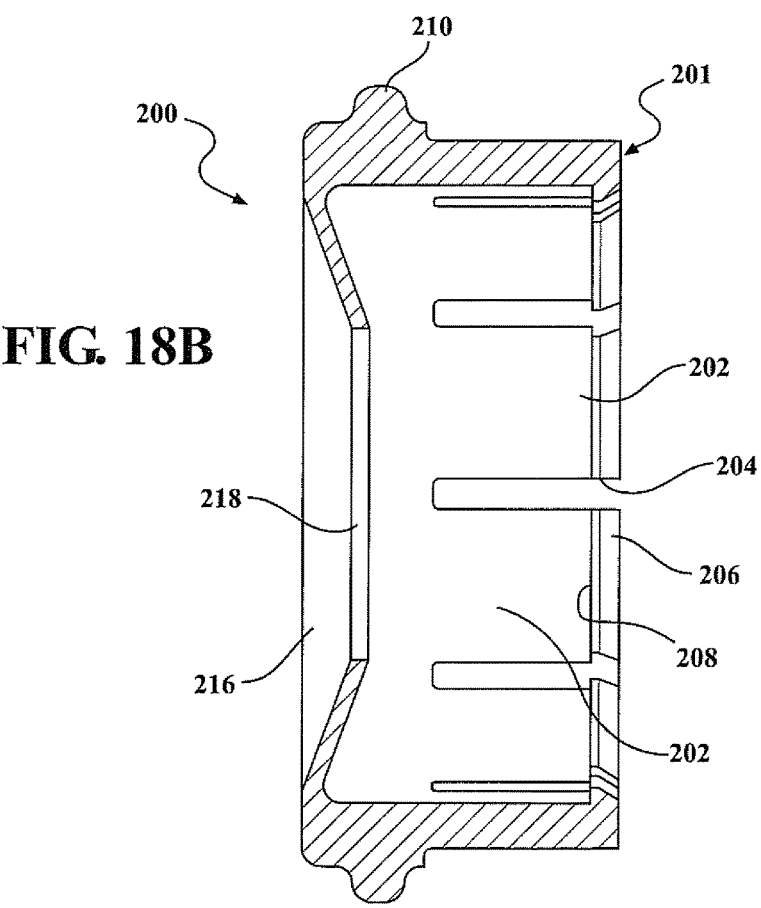
FIG. 18B is a cross-sectional view of the assurance cap shown in FIG. 18A.

FIGS. 18A and 18B depict another aspect of assurance cap 200 which is substantially similar to assurance cap 170 in that assurance cap 200 is formed of continuous one-piece body 201 comprising a plurality of fingers 202 at first end spaced apart by slots 204. Fingers 202 terminate in inward extending edge 206 comprising inner shoulder 208 to engage edge 96 in groove 98 of body 26 when assurance cap 200 is moved to its forward position relative to body 26 indicating full insertion of tubular member 24 in body 26.

Radially outward extending rib 210 is formed in body 201 intermediate the first and second ends. Second end 212 of body 201 is formed as annular ring 214 from which conically shaped radially inward extending skirt 216 extends to inner edge 218 defining an aperture the same size or slightly larger than the outer diameter of the constant diameter portion of tubular member 24.

In this aspect of assurance cap 200, skirt 216 does not include any slots. This aspect includes assurance cap 200 installed on tubular member 24 before the ramp or endform is formed.

Figure 19A:
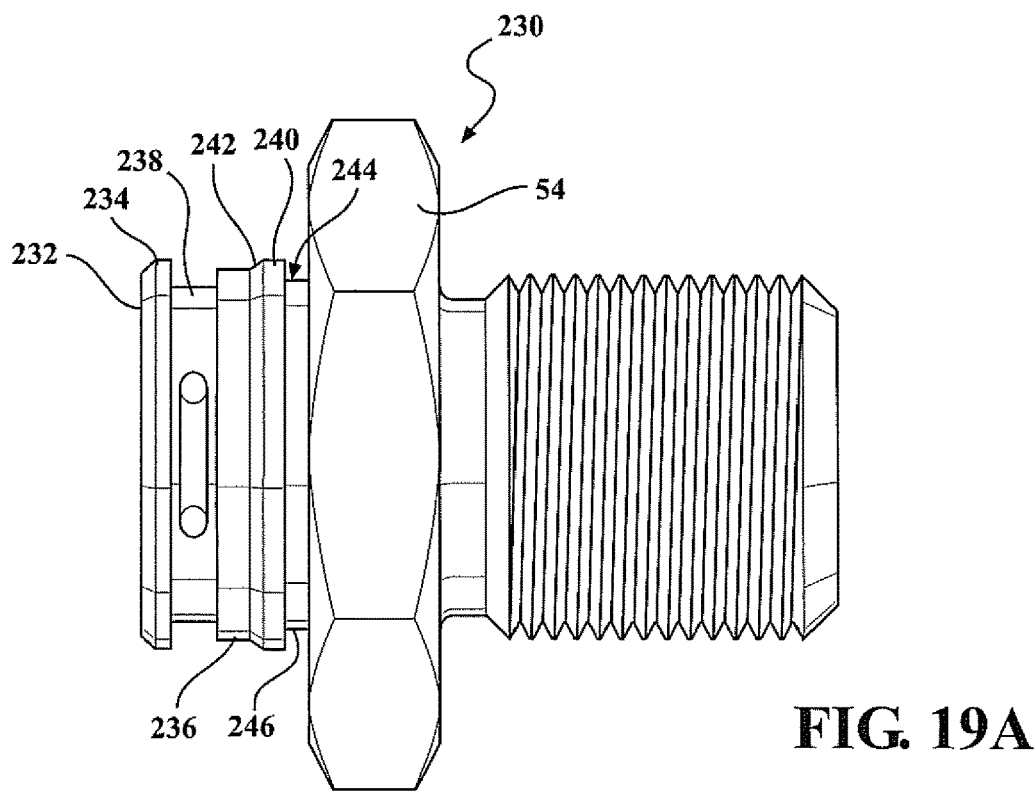
FIG. 19A is a side elevational view of another aspect of a quick connector body.
Figure 19B:
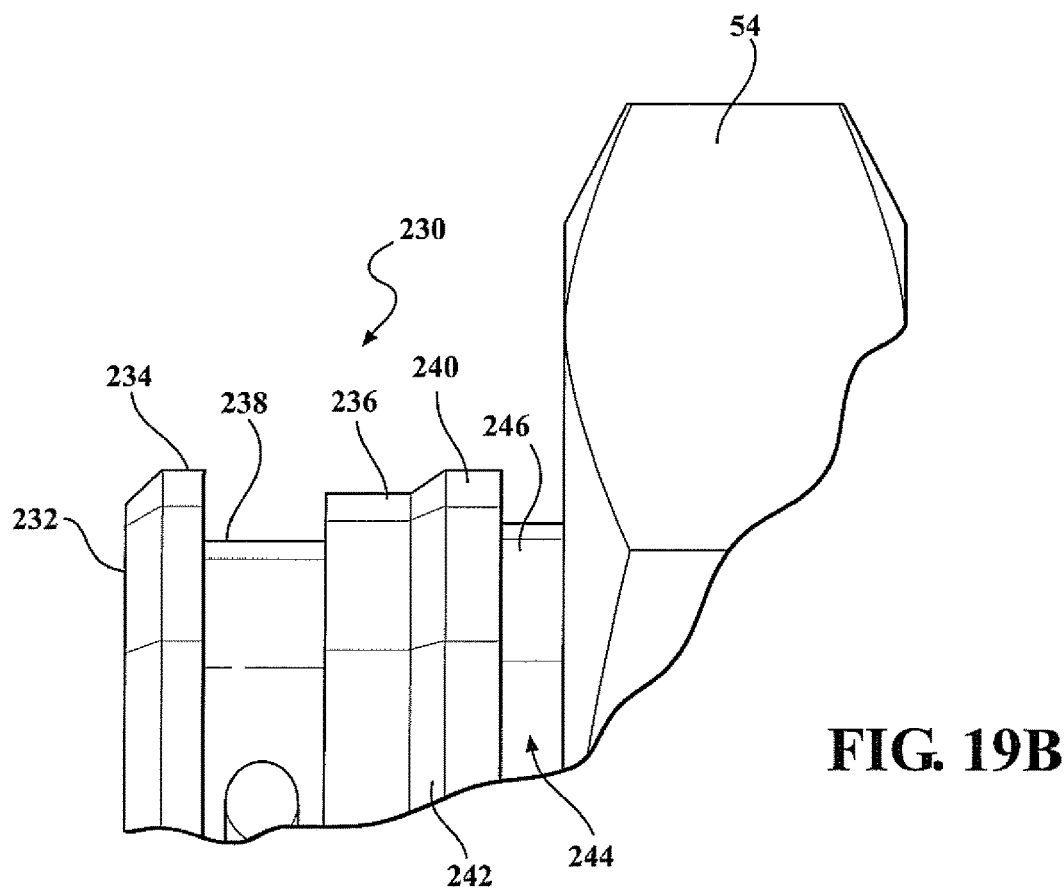
FIG. 19B is a partial, enlarged side elevational view of a portion of a quick connector body shown in FIG. 19A.

Referring now to FIGS. 19A and 19B, there is depicted another aspect of body 230, which includes variations from body 26 shown in FIG. 9. As most of body 230 is identically constructed as body 26, only variations between body 230 and body 26 will be described in detail.

As shown in body 26 depicted in FIG. 9, receiving portion 56 extending from end 57 of fitting body 26 includes a constant outer diameter. This allows radially inward turned edges 92 of fingers 80, 82, and 84 on first end 74 of assurance cap 70 to snap into recessed groove 98 in body 26.

In body 230 depicted in FIGS. 19A and 19B, the receiving portion extending from first end 232 of body 230 comprises first diameter end portion 234 and second smaller diameter end portion 236 disposed on opposite sides of groove 238 which receives resilient clip 60. Raised intermediate annular ring 240 is formed adjacent to second end portion 236 and includes radially outward, extending conically shaped, tapered endwall 242 extending from second end portion 236. The outer diameter of ring 240 is larger than the diameters of first and second end portions 234 and 236 of the receiving portion of body 230.

Recessed groove 244 is formed between annular ring 240 and hexagonal shaped portion 54 of body 230. Inner surface 246 of groove 244 comprises a diameter smaller than the diameter of second end portion 236 of the insertion portion of body 230 to define a recess for receiving the latch portions of the fingers of the assurance cap in the fully inserted position relative to body 26.

During such forward sliding movement of any of the assurance caps described above, the radially inward turned fingers of the assurance cap flex outward over tapered endwall 242 and then along the outer surface of ring 240 before snapping in latched engagement with groove 244 to provide the secondary latch function for the assurance cap.

Figure 20A:
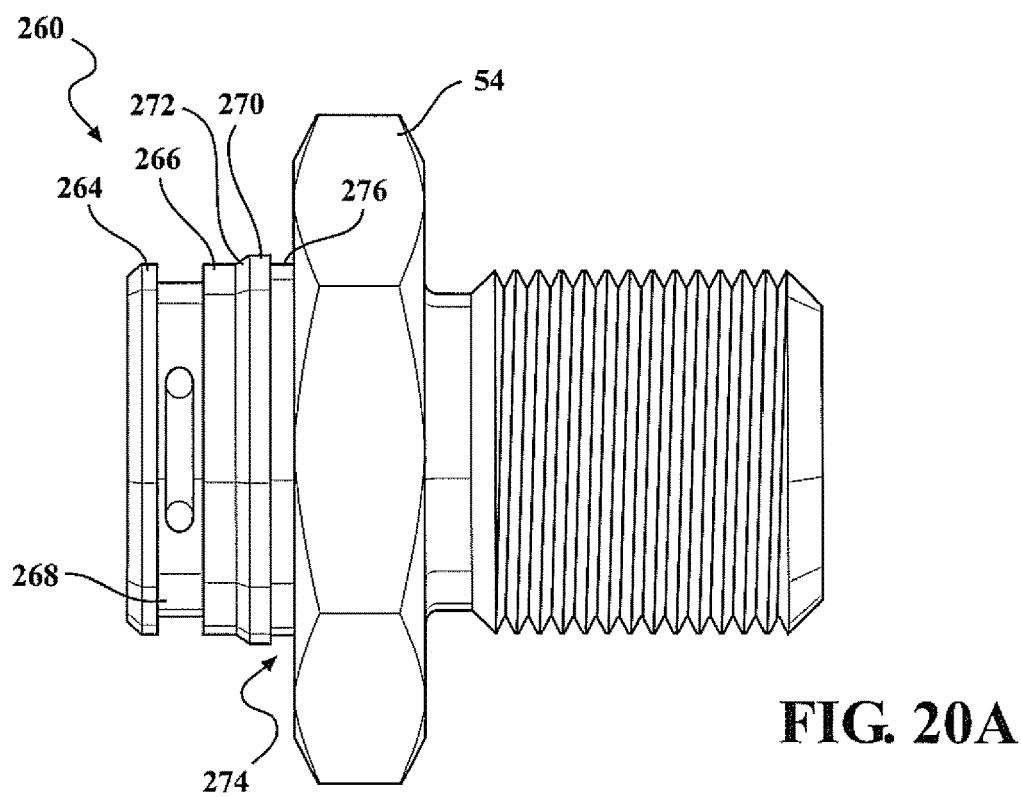
FIG. 20A is a side elevational view of another aspect of a quick connector body.
Figure 20B:
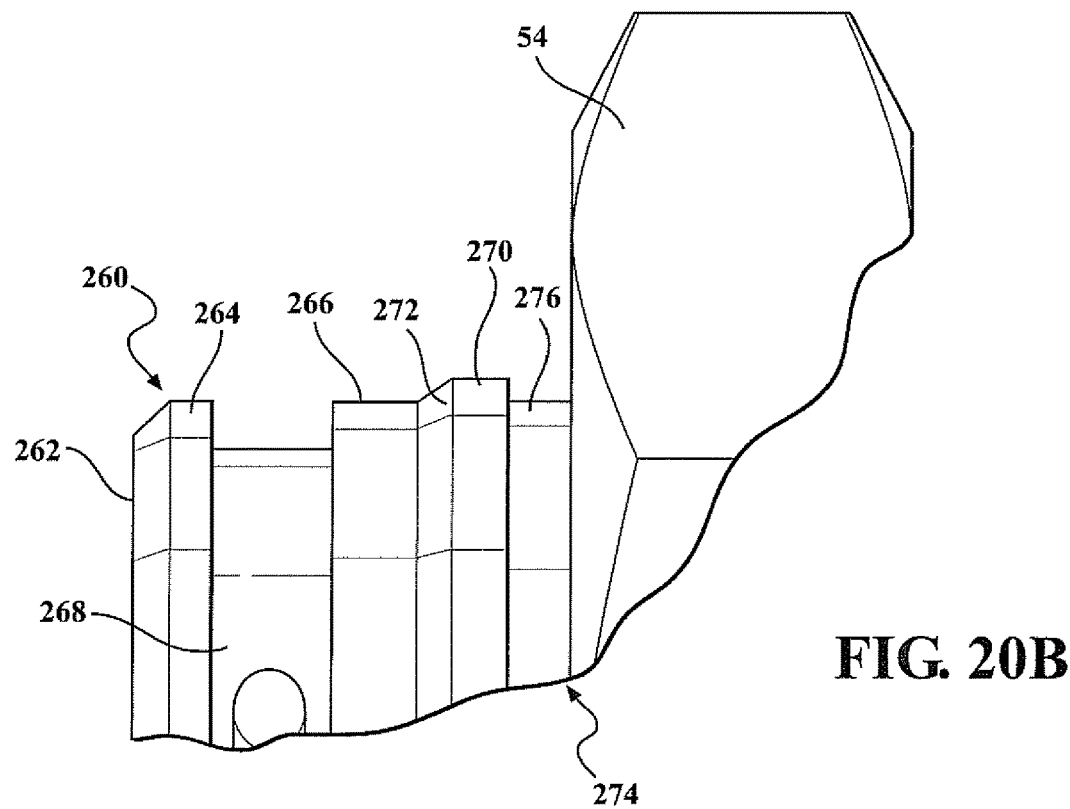
FIG. 20B is a partial, enlarged side elevational view of a portion of a quick connector body shown in FIG. 20A.

In another variation of body 260 shown in FIGS. 20A and 20B, again body 260 is substantially the same as body 26 and only variations there between will be described in detail.

Like body 230 shown in FIGS. 19A and 19B, body 260 comprises first end 262 from which extends first end portion 264 of the receiving portion at a first diameter. The receiving portion includes second end portion 266, also at the same diameter to define recess 268 for resilient clip 60.

Body 260 also includes raised annular ring 270 comprising an outer diameter greater than the first diameters of first and second end portions 264 and 266. Radially outward, conical shaped tapered surface 272 extends from second end portion 266 to raised annular ring 270. Recess or groove 274 is formed between raised annular ring 270 and hexed shaped portion 54 of body 260. Inner surface 276 of groove 274 is spaced at the same first diameter of first and second end portions 264 and 266 of the receiving portion of body 260.

In this aspect, annular ring 270 forms a raised outermost portion of the receiving portion of body 260. The difference between the outer diameter of annular ring 270 and inner surface 276 of adjacent groove 274 requires that the fingers on the assurance cap can be flexed outward over the raised outer edge of annular ring 270 before snapping over the outer edge of annular ring 270 into groove 274.

Figure 21A:
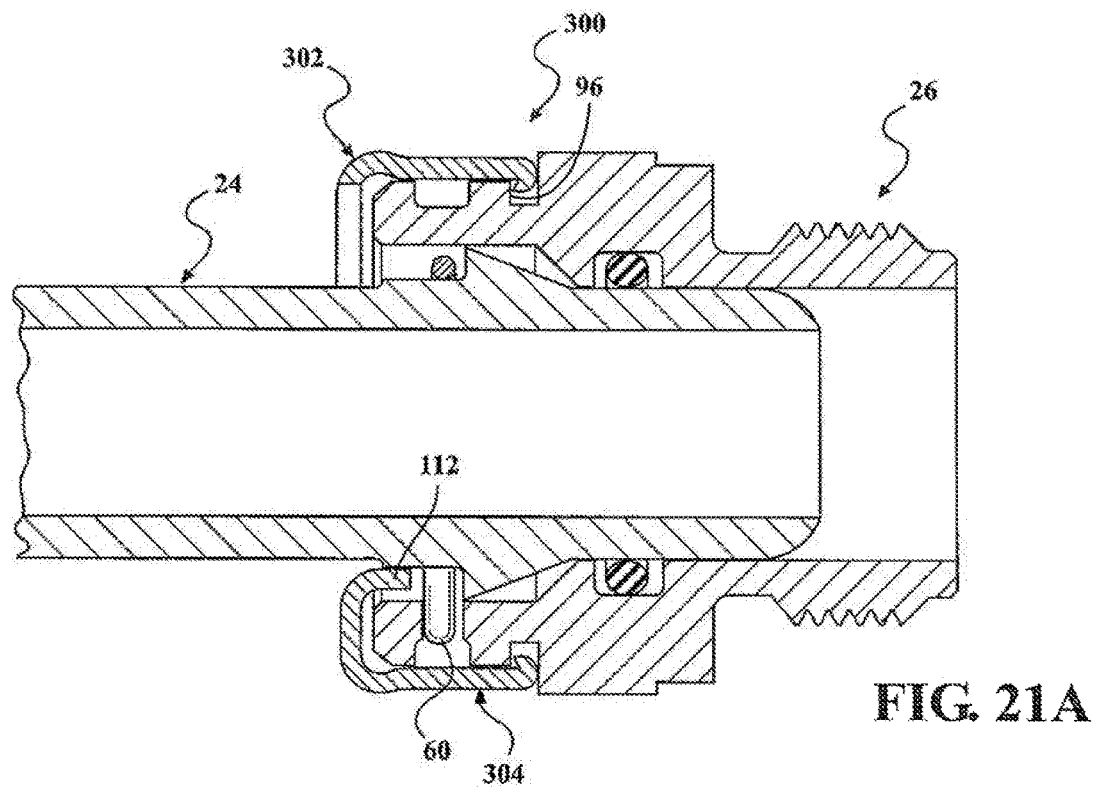
FIG. 21A is a perspective view of another aspect of an assurance cap shown in an assembled position on a quick connector body; and, FIG. 21B is a longitudinal cross-section of the assurance cap and quick connector body shown in FIG. 21A.
Figure 21B:
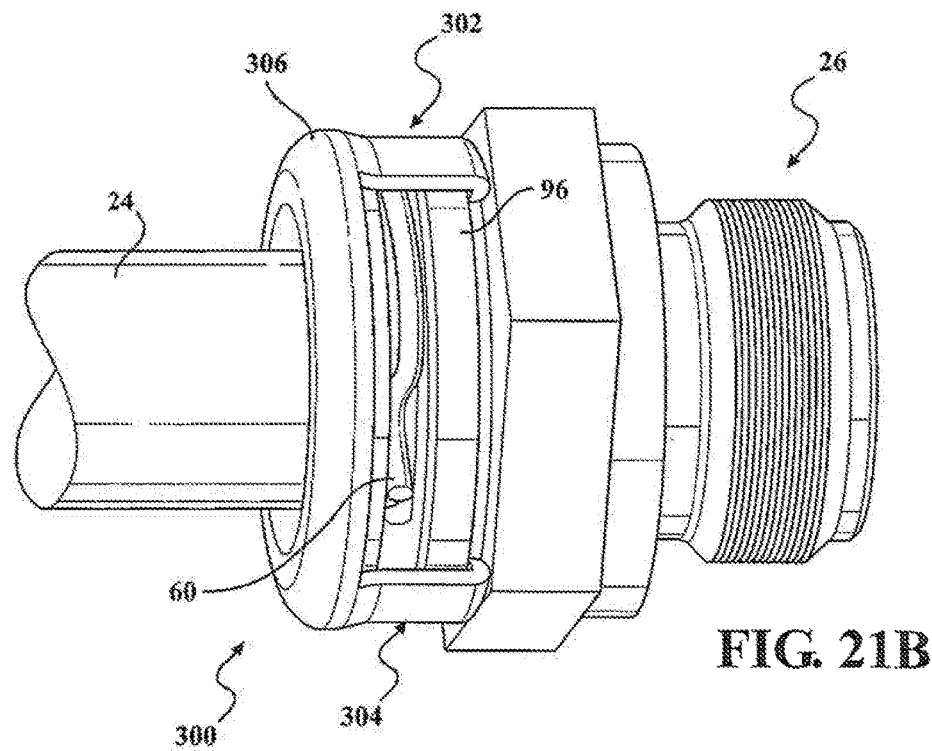

Referring now to FIGS. 21A and 21B, there is depicted another variation in the construction of assurance cap 300. In this aspect, assurance cap 300 is similar to assurance cap 70 described above and shown in FIGS. 2-8D except that the assurance cap 300 includes two small latch fingers 302 and 304 extending from intermediate annular portion 306. Fingers 302 and 304, which can be provided in any number, such as two, three, or more fingers, are configured more as standalone latch fingers rather than the closely separated fingers 82, 84 and 86 on assurance cap 70, which have a much longer circumferential extent.

Latch fingers 302 and 304 are constructed similarly to latch fingers 82, 84 and 86 in assurance cap 70 and are designed to snap into and latch in groove 98 on body 26 when tubular member 24 is fully inserted into body 26.

Fingers 302 and 304 are spaced apart about the circumference of assurance cap 300 in an angular orientation designed to intercept the raised portions of the resilient clip which would extend outward beyond the upper extent of receiving portion 56 of body 26 from groove 98 when tubular member 24 is not fully inserted in body 26. Thus, for example, in a two finger construction shown in FIGS. 21A and 21B, the two fingers 302 and 304 are spaced less than 180° apart to one side of assurance cap 300 and greater than 180° apart on the other side of assurance cap 300.

As shown in FIG. 21B, fingers 302 and 304 are circumferentially spaced so that at least one of fingers 302 or 304 is in a interference position with retainer clip 60 so as to strike a raised portion of retainer clip 60 extending out of groove 68 in body 26 to prevent full movement of assurance cap 300 to the fully forward latched position. This assures that assurance cap 300 functions in its intended manner regardless of its angular orientation with respect to the protrusions and outer portions of retainer clip 60 in the groove 58.

What is claimed is:

1. A fluid connector assembly, comprising:
   a tubular member including an endform spaced from a first insertion end defining a radially disposed shoulder;
   a connector body including a bore with one open end receiving the tubular member;
   a retainer clip carried on the connector body and extending partially into the bore to engage the shoulder to lock the tubular member in the connector body when the first insertion end is fully inserted into the bore;
   an assurance cap slidably mounted relative to the tubular member, the assurance cap defining a body including a plurality of primary latch fingers having end projections configured for latching in a recessed groove in the connector body to latch the assurance cap on the connector body only when the tubular member is fully inserted into the connector body; and,
   a secondary latch carried on the assurance cap body for engaging one of the retainer clip and the tubular member to secondarily latch the assurance cap to the tubular member and only when the tubular member is fully inserted into the bore.

2. The fluid connector assembly of claim 1, wherein the plurality of primary latch fingers are circumferentially spaced and extend from a first end of the assurance cap body.

3. The fluid connector assembly of claim 1, wherein each of the plurality of primary latch fingers comprises:
   a radially inward projection formed on an end of the primary latch finger, the radially inward projection arranged to engage the recessed groove to primarily latch the assurance cap to the connector body only when the tubular member is fully inserted into the bore in the connector body.

4. The fluid connector assembly of claim 1, wherein:
   the secondary latch comprises an inner support ring fixed in the assurance cap body radially inward of the plurality of primary latch fingers;
   the inner support ring comprises a through bore through which the tubular member extends; and,
   the inner support ring comprises an inner end positioned to engage a surface on the tubular member to provide a secondary latch between the assurance cap body and the tubular member when the tubular member is fully inserted into the bore in the connector body.

5. The fluid connector assembly of claim 4, wherein the surface on the tubular member is axially spaced from the endform and defines a raised surface on the tubular member.

6. The fluid connector assembly of claim 4, wherein the through bore in the inner support ring has a keyhole shape.

7. The fluid connector assembly of claim 1, wherein the secondary latch comprises:
   a plurality of stepped fingers circumferentially spaced between the plurality of primary latch fingers; and,
   each of the stepped fingers having an inner surface with at least one step configured to overlay a radially outward portion of the retainer clip when the assurance cap is latched to the connector body and the tubular member to resist radially outward expansion of the retainer clip.

8. The fluid connector assembly of claim 7, wherein:
   the plurality of primary latch fingers are circumferentially spaced and extend from a first end of the assurance cap body; and,
   one of the plurality of stepped fingers is disposed circumferentially intermediate at least two of the plurality of primary latch fingers.

9. The fluid connector assembly of claim 8, wherein:
   the plurality of primary latch fingers are arranged in circumferentially spaced pairs of adjacent side-by-side arranged primary latch fingers; and,
   one of the plurality of stepped fingers is interposed between each pair of primary latch fingers.

10. The fluid connector assembly of claim 1, wherein a raised portion of the connector body includes an outward extending tapered portion extending from an outer diameter of the connector body to an outer surface of the raised portion of the connector body.

11. The fluid connector assembly of claim 1, further comprising:
    a raised portion formed on a receiving end of the connector body having an outer diameter substantially equal to an outer diameter of the receiving end of the connector body extending from the receiving end of the connector body; and,
    an annular recess positioned adjacent to the raised portion for receiving the latch fingers of the assurance cap in a latch position of the assurance cap on the connector body.

12. The fluid connector assembly of claim 1, wherein:
    the assurance cap body includes pivotally connected first and second sections lockable in a continuous annular body about the tubular member; and,
    the first and second sections of the assurance cap body being pivotally movable relative to a pivotally connected end of the first and second sections to allow mounting of the assurance cap body around the tubular member.

13. The fluid connector assembly of claim 1, wherein the secondary latch comprises:
   an inner support ring fixed in the assurance cap body radially inward of the plurality of primary latch fingers;
   the inner support ring having a through bore through which the tubular member extends;
   the inner support ring having an inner end positioned to engage a surface on the tubular member to provide a secondary latch between the assurance cap body and the tubular member when the tubular member is fully inserted into the bore in the connector body;
   the surface on the tubular member is axially spaced from the endform and defines a raised surface on the tubular member;
   a plurality of stepped fingers circumferentially spaced between the plurality of primary latch fingers; and,
   each of the plurality of stepped fingers having an inner stepped surface configured to overlay a radially outward portion of the retainer clip when the assurance cap is latched to the connector body and the tubular member to resist radially outward expansion of the retainer clip.

14. The fluid connector assembly of claim 13, wherein:
   the plurality of primary latch fingers further include a plurality of circumferentially spaced primary latch fingers extending from a first end of the assurance cap body; and,
   one of the plurality of stepped fingers is disposed circumferentially intermediate at least two of the plurality of primary latch fingers.

15. The connector assembly of claim 14, wherein:
   the plurality of primary latch fingers are arranged in circumferentially spaced pairs of adjacent side-by-side arranged primary latch fingers; and,
   one of the plurality of stepped fingers is interposed between each pair of primary latch fingers.

* * * * *